United States Patent [19]

Crohn

[11] Patent Number: 4,805,096
[45] Date of Patent: Feb. 14, 1989

[54] INTERRUPT SYSTEM

[75] Inventor: David C. Crohn, Shoreview, Minn.

[73] Assignee: ETA Systems, Inc., St. Paul, Minn.

[21] Appl. No.: 22,435

[22] Filed: Mar. 6, 1987

[51] Int. Cl.⁴ .............................................. G06F 9/48
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,028,667 | 6/1977 | Breslau et al. | 364/200 |
| 4,047,161 | 9/1977 | Davis | 364/200 |
| 4,193,119 | 3/1980 | Arase et al. | 364/900 |
| 4,271,467 | 6/1981 | Holtey | 364/200 |
| 4,275,458 | 6/1981 | Khera | 364/900 |
| 4,394,728 | 7/1983 | Comfort et al. | 364/200 |
| 4,564,900 | 1/1986 | Smitt | 364/200 |

Primary Examiner—David Y. Eng
Attorney, Agent, or Firm—Kinney & Lange

[57] ABSTRACT

An interrupt notice system for permitting individual ones of a plurality of operating devices to indicate to others that an interrupt of their operations is being initiated through transmitting an interrupt through a controller at a proper time. The controller provides for directing such interrupt, and for synchronizing the system.

29 Claims, 15 Drawing Sheets

INTERRUPT SYSTEM

BACKGROUND OF THE INVENTION

FIELD OF THE INVENTION

The present invention relates to interrupt systems for computers and, more particularly, to interrupt systems for computers using multiple processors.

There is a continual demand by users of computers for improved computers having greater capabilities at an acceptable cost. In the past, this demand has been primarily met by increasing the performance rapidity of the computer data manipulations and by increasing the size of the data portions being manipulated, both improvements made using primarily a single central data processing unit. As this manner of improving computer capabilities has progressed, the various electronic means of implementing these improvements have begun to approach certain physical limitations making further gains more difficult to achieve and more costly.

One way in getting around these difficulties is to use more than one central processor. Thus, a sequence of computer manipulations forming a process can be divided in one or more of various ways to permit allocating various portions of the computer manipulations to each of such additional central processors. Since these processors can be operated simultaneously, there is the possibility of getting more of the manipulations, which would have been sequentially done by a single processor, to be completed simultaneously by the several processors to thereby enable more manipulations being completed per unit of time.

This manner of achieving computer capability improvements is not free from problems, however. Even though the manipulation tasks are divided in some manner and assigned to the various central processors, the processors usually cannot operate independently but may depend on results obtained from one or more of the other processors, or on access to the same data in a common memory at the same time as does one or more of the other procesors, or the like. To accommodate such needs, an interrupt arrangement is required permitting a processor to interrupt another to obtain results therefrom, for example, or to be given access to the memory portion also required by the other processor, or for some other purpose. Further, many pieces of equipment connected to the computer will have occasion to interrupt one or more processors for purposes related to that piece of equipment or to provide some input related to other activities undertaken by the computer.

Such an interrupt arrangement can be implemented by having an interrupt notice system to provide a notification signal to any of the processors, in a cooperative arrangement thereof, that some other processor in the arrangement has begun steps to interrupt its operation. The computer must have some further arrangements in place so that, upon receipt of such an interrupt notice, the processors involved can interact in a manner to find a way to satisfy the needs of each to permit operations after some point to continue for each.

An interrupt notice system could be operated on the basis of each processor being directly interconnected to each other processor through a central controller in a cooperative arrangement. Each processor would have the ability to send signals to every other processor on the basis of an address of that other processor in the system. That is, the interrupt notice system controller would have to extend therefrom N signal address lines to each processor in the system where N must be such that $2^N$ equals or exceeds the number of processors in the system. Further, since each of the processors must be able to initiate an interrupt to be sent to another, there would also have to be N signal lines coming from each processor to the interrupt system controller. In a computer with a small number of processors, this arrangement may be satisfactory but becomes it a burdensome interconnection problem as the number of processors increases significantly.

Thus, for 4 processors, two signal lines in and two signal lines out for each of the four processors are needed leading to 16 total interconnections—just four lines between the interrupt system controller and each of the processors. For 48 processors, however, there will be six lines required to and six lines from each processor giving a total of 288 interconnections for signals coming into the interrupt system controller and 288 interconnections for signals going out from the interrupt system controller. Thus, an interrupt notice system for a multiple procesing arrangement which reduces the numbers of interconnections needed, even though a relatively large number of processors are used in the computer arrangement, e.g. system, would be desirable.

SUMMARY OF THE INVENTION

The present invention provides an interrupt notice system permitting individual ones of a plurality of operating devices in a cooperative arrangement thereof, to indicate to others in that arrangement that procedures to interrupt their operations are being initiated. This is done through having each operating device initiating an interrupt cause a signal to be provided in a timely manner to a signal assigner means in a proper assignment state which assigns a representation of that signal to the interface with the operating device being interrupted. A synchronizing means, operated in conjunction with the signal assigner means, provides a receive indication to each such operating device interface in those assignment states in which it can expect an interrupt signal, if any, from a particular selected operating device, and provides a transmit indication to each such interface at those assignment states in which it can expect to transmit an interrupt signal to reach a selected operating device interface.

DETAILED DESCRIPTION OF THE PREFERRED EMBODIMENTS

Figure 1:
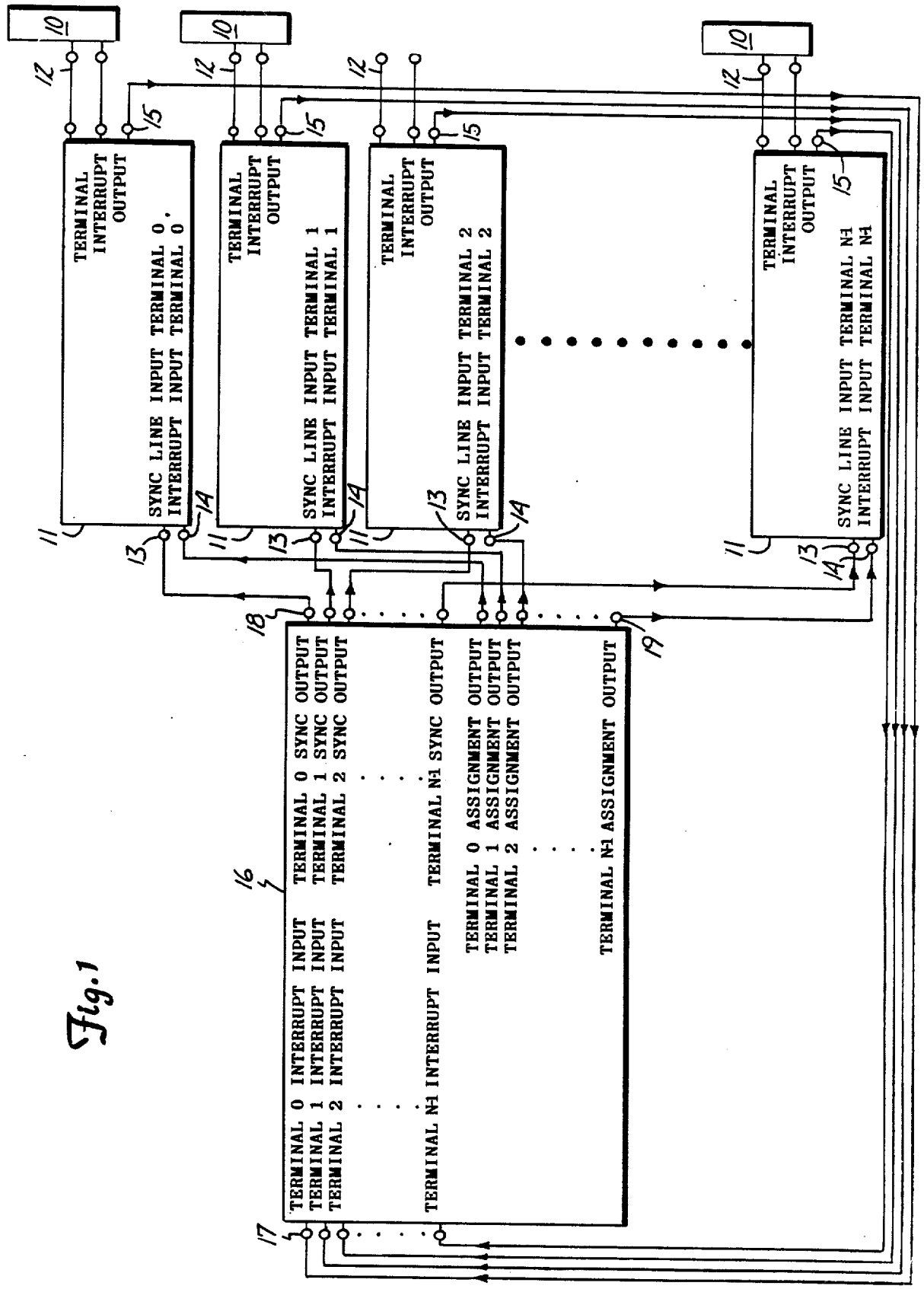
FIG. 1 is a diagrammatic representation of the system of the present invention.

FIG. 1 shows a block diagram of the interrupt notice system of the present invention. The operating devices, 10, are the devices in a cooperative arrangement (interconnections therebetween for other purposes not being shown) each of which is to be able to provide interrupt notice signals to others in the cooperative arrangement, usually a computer system, to operate satisfactorily as a joint entity. Cooperative operating devices 10 will typically be various central processing units, peripheral processing units, and the like.

Each of cooperative operating devices 10 present is electrically connected to a corresponding interface signal terminal, 11, although some signal terminals 11 do not have operating devices connected thereto. Each signal terminal 11, and its corresponding operating device 10 connected thereto, can transfer electrical signals to one another through an interconnection means, 12, provided to interconnect certain of the various inputs and outputs of each.

Signal terminals 11 have two further inputs and one further output. The two further inputs, 13 and 14, are designated Terminal x sync line input and Terminal x interrupt input, respectively. In the description of the previous sentence, x was substituted for the actual number of the signal terminal 11 in the sequence thereof in FIG. 1 which can range from zero to N−1. The value of N depends on how many signal terminals 11 are provided for a particular system based on the maximum number of expected operating devices to ever be connected into the cooperative arrangement. A further output, 15, for each of signal terminals 11 is designated Terminal x interrupt output where again x is substituted for the numerical designation in the sequence of signal terminals 11 shown in FIG. 1.

Each of signal terminal outputs 15 is electrically connected to an interrupt controller, 16, at a corresponding one of a set of inputs, 17, thereof. Each one of a set of outputs, 18, of controller 16 is electrically connected to a corresponding input 13 of a signal terminal 11. Another set of outputs, 19, from interrupt controller 16 are each electrically connected to a corresponding input 14 of a signal terminal 11.

Through interrupt controller 16, each signal terminal 11 in the system, and its corresponding operating device 10, have the ability to interrupt the data processing of, or be interrupted in its own data processing by, any other signal terminal 11 and its corresponding operating device. Interrupt controller 16 does this by receiving and accepting interrupt signals at its inputs 17 on a request basis from each of signal terminals 11, a set of these interrupt signals being presented at inputs 17 once in each "assignment state" of interrupt controller 16. During such an assignment state, the signals received on input 17, or representations of such signals, are each "assigned," or presented, to one of outputs 19, the particular output 19 being determined by which assignment state interrupt controller 16 is in. In the next succeeding assignment state, the input signal received on any one of inputs 17 will have a representation thereof presented to the next succeeding one of outputs 19 in the order thereof beyond that output 19 to which signals from that same input were presented in the preceding assignment state.

This assignment of representations of signals appearing at inputs 17 in each assignment state proceeds cyclically. Interrupt controller 16 will in each assignment state present a signal received at any one of its inputs 17, or a representation thereof, to each of outputs 19 through one cycle of a cyclically repeating sequence of assignment states. Since there are N signal terminals, a cycle of the repeating sequence of assignment states is N assignment states in duration. Both the sequence of terminals 11 and the sequence of states are numbered from 0 to N−1.

Thus, there is no need for an interrupt controller that provides an address for each signal terminal 11 to which it is to send an interrupt signal, nor for each signal terminal 11 to provide an address to such an interrupt controller of that signal terminal 11 it must interrupt. Rather, there merely need be a single interrupt signal interconnection line from an interrupt controller like controller 16 extending from an output 19 thereof to each corresponding input 14 of a signal terminal 11, and one further interconnection line returning from output 15 of that signal terminal 11 to interrupt controller 16 at a corresponding input 17 thereof. One further interconnection line from each output 18 of interrupt controller 16 to each corresponding input 13 of signal terminals 11 allows interrupt controller 16 to provide synchronizing signals to the terminals 11 to keep activities of each of signal terminals 11 corresponding in time to those occurring in interrupt controller 16.

As a result, no more than three interconnections are required between interrupt controller 16 and each of signal terminals 11—no matter how numerous such terminals become in the cooperative arrangement of operating devices. That is, the number of interconnections between interrupt controller 16 and signal terminals 11 grows with a factor on the order of 3N rather than with a factor $2^N$ which would result if an addressing system was used. For incresing values of N, the former factor clearly lags the magnitude growth of the latter factor.

Figure 2A:
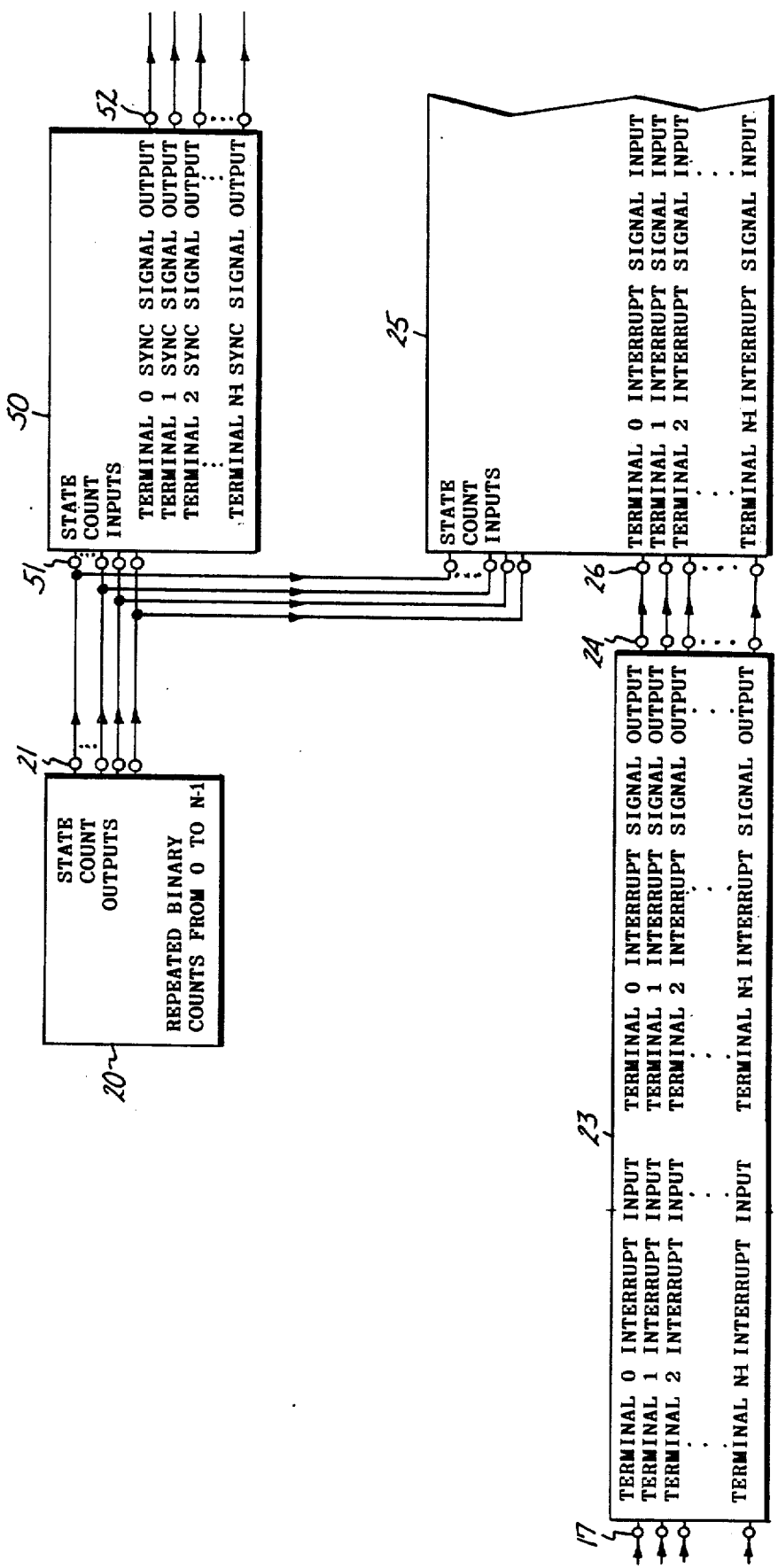
FIGS. 2A and 2B are right hand and left hand parts of a diagrammatic representation of a portion of the present invention shown in FIG. 1, FIGS. 3A and 3B are right hand and left hand parts of a diagrammatic representation of the present invention shown in FIGS. 2A and 2B.
Figure 2B:
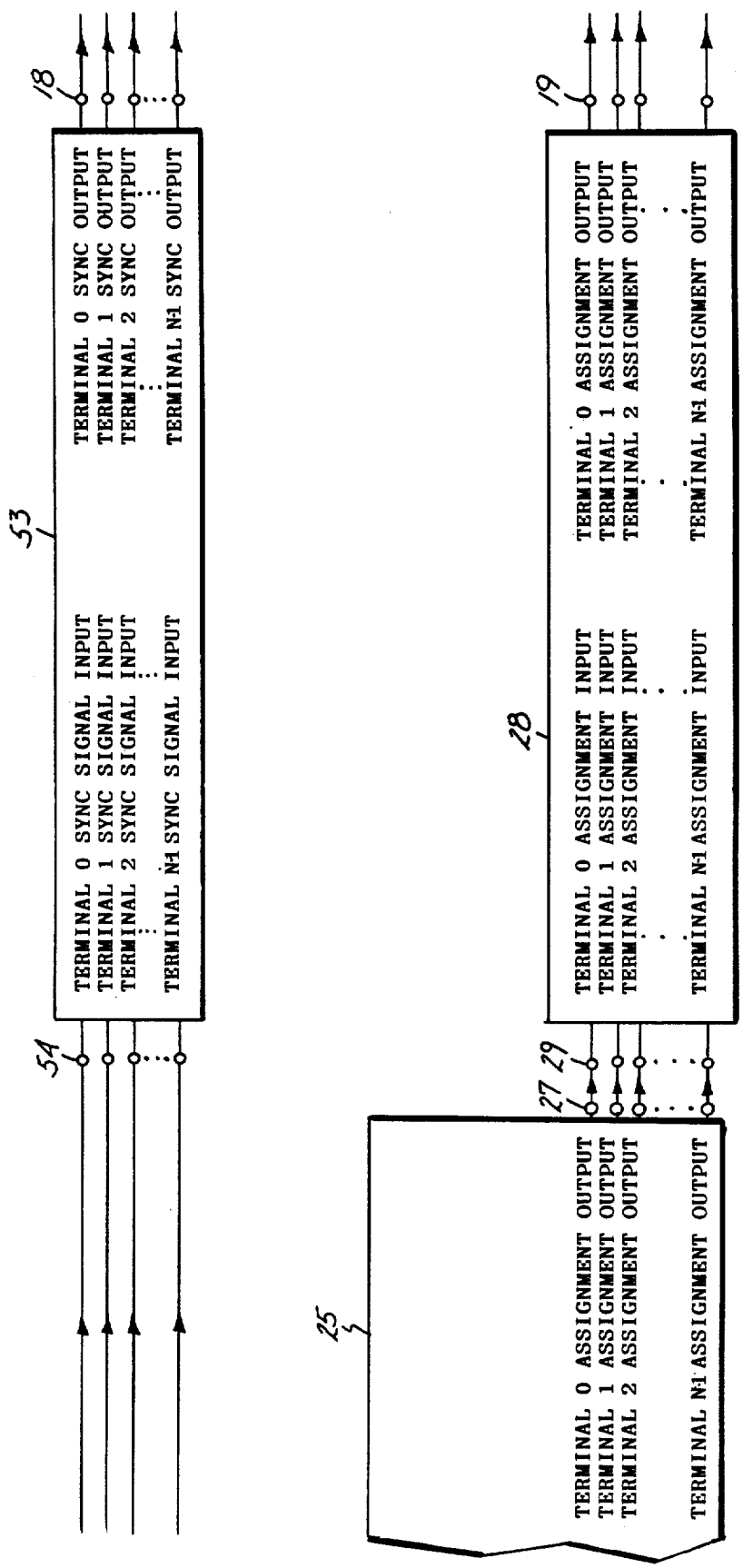

A more detailed block diagram of interrupt controller 16 is shown in FIGS. 2A and 2B to be viewed with FIG. 2A on the left and FIG. 2B on the right. Inputs from the system clock have been omitted for purposes of clarity, but the system clock determines the count rate of the interrupt controller counter, 20, as well as the timing of operations in other blocks in the system. Counter 20 is a binary counter which provides successive binary numbers as state counts at its state count outputs, 21. Counter 20 counts from zero to N in binary and then repeats that sequence of counts starting with zero again forming in this manner a cyclical counter. Each count determines a switching state, or signal status, for the interrupt notice system.

Interrupt signals supplied by signal terminals 11 to inputs 17 of interrupt controller 16 under control of operating devices 10 are shown in FIG. 2A to result in such signals being applied to an interrupt controller input register, 23, where they are held for one count or assignment state. They are then provided at input register outputs, 24, and simultaneously transmitted to an interrupt controller shifter, 25, at its inputs, 26, the Terminal x interrupt signal inputs.

Interrupt controller shifter 25, in each state set by counter 20, receives and accepts signals at its inputs 26 transmitted from signal terminals 11 and through input register 23 with the indicated one state delay. These delayed signals, or representations thereof, are presented to outputs, 27, of interrupt controller shifter 25, the Terminal x assignment outputs, after each has been shifted with respect to the input 26 at which the basis thereof arrived from a correspnding signal terminal 11. The shift of each such signal is to that output 27 (corresponding to that signal terminal 11 to which they are to be transmitted) determined by the shifting state in which shifter 25 has been placed by counter 20 in setting assignment states of its interrupt controller 16. At outputs 27, the signals, or representations thereof, as shifted, are presented to an interrupt controller output register, 28, at its inputs, 29, the Terminal x interrupt inputs.

Shifter 25 provides shifts for signals provided at its inputs 26 to selected ones of its outputs 27 by establishing appropriate corresponding conductive paths therebetween. Alternatively, clocked shift registers could be used if driven by a clock which operated at least N times as rapidly as counter 20 in providing output pulses.

A particular assignment state can conveniently be chosen as a reference state. The state chosen is that state in which an interrupt signal transmitted by a signal terminal 11 to an interrupt controller input terminal 17, if any, would thereafter be presented (or its representation) at some later time, or state, (set by the transmission delay through interrupt controller 16) through shifting by interrupt controller shifter 25 to that same signal controller 11 at its connection to the corresponding output 18 of interrupt controller 16, i.e. with no shift. Then, in the next succeeding assignment state after the reference state, the signals transmited by signal terminals 11 to inputs 17 will be the basis, after a similar transmission delay, for representations appearing on outputs 18 shifted one further position.

That is, a signal transmitted from output 15 of, say, the third signal terminal 11 in the sequence thereof, during the reference state, will be presented to the corresponding input 26 of shifter 25 after a one state delay in input register 23 (part of the transmission delay). After so reaching shifter 25 at the corresponding input 26, this signal, or representation thereof, will be presented to that output 27 of shifter 25 corresponding to the same third signal terminal 11 and simultaneously to output register 28 for another one state delay (again, part of the transmitting delay). This signal is then transmitted from the corresponding output 19 of interrupt controller 16 to the third signal terminal 11.

In the next succeeding assignment state after the reference state, a signal transmitted from the third signal terminal 11 will be presented (or a representation thereof) on that output 19 of interrupt controller 16 (after the same transmission delay) corresponding to the fourth signal terminal 11 in the sequence thereof—a shift of one. This shift of one is provided by the action of shifter 25 through its shifting of signals (in one assignment state) received on its inputs 26 from signal terminals 11 to the outputs 27 thereof corresponding to the next one of signal terminals 11 in the sequence thereof. The sequence of signal terminal 11 connections to interrupt controller 16 is the same at inputs 17 and outputs 19 thereof, a sequence also followed by the corresponding connections to inputs 26 and outputs 27 of shifter 25.

As stated above, the actual arrival of a transmitted signal from one of signal terminals 11 at a corresponding input 17 of interrupt controller 16, and the departure of that signal, or a representation thereof, from an output 19 of interrupt controller 16, will take two assignment states (the transmission delay through controller 16) because of the presence of both interrupt controller input register 23 and of interrupt controller output register 28. Further, it is possible for some shifters (or shift registers), suitable for use as interrupt controller shifter 25 (or for shift register 25 if shift registers are used instead), to take up further assignment states in completing the shifts required therein. That situation could result in an even longer transmission delay in completing an assignment of signals, or a representation of such signals, received at inputs 17 to interrupt controller outputs 19. Timing of events throughout the interrupt system must be adjusted to accommodate for any such delays.

In any event, interrupt controller shifter 25 is to complete a shift operation of x shifts, $0 \leq x \leq N-1$, in each of the assignment states established by a count from counter 20, and this shift operation is to provide that number of shifts equal to the number of assignment states that have passed since the last reference assignment state in a cycle of such states. Thus, if four assignment states have occurred since a signal was received on the corresponding input 17 of interrupt controller 16 from the third one of the signal terminals 11 in the reference state, that signal beginning transmission in this fourth assignment state, or a representation of that signal, would be provided to the output 19 corresponding to the seventh one of signal terminals 11 after the transmission delay through interrupt controller 16.

The passing of a sufficiently further number of assignment states since the original reference state of the preceding paragraph, so that a count of such states would exceed N, will result in a history of signals provided at any of interrupt controller inputs 17 which have, or which are the basis for representations which have, been (a) successively assigned to each of outputs 19 since this original reference state, (b) then again to the output 19 connected to the signal terminal 11 to which is also connected the input 17 providing the signal to form a new reference state for the next sequence cycle, i.e. no shift, and (c) then again assigning them to successive outputs 19 past that one connected to the signal terminal 11 to which representations were presented in the new reference assignment state. That is, the assignment of representations is done on a cyclical basis among the signal terminals 11 so that the shift positions along the terminal connected to outputs 19 of controller 16 are a circular permutation of the sequence of signal terminals 11 connected along interrupt controller inputs 17.

Thus, if just one input terminal were chosen to provide a signal to its corresponding interrupt controller input 17 in each state during a cycle of assignment states, such as the third one of signal terminals 11, for example, such a repeated input signal, or a representation thereof, will be successively presented to each signal terminal 11 connected to interrupt controller outputs 19 after a transmission delay in a sequence, a sequence which would repeat for every repetition of the cycle of N assignment states. This output sequence of terminals 11, connected to outputs 19, in being assigned representations, will follow the same order as the connection of the same terminals at inputs 17, but may begin and end with different ones of these terminals, a permutation of the input connection order. Since there are only N terminals, those dropped from one end of the input connection order must be added to the other end of this order, but still maintaining the order, thus forming a circular permutation of the input connector order to form the output sequence.

A similar output sequence would occur if the signals were received at a corresponding interrupt controller input 17 from a different one of signal terminals 11, although this output sequence would be circularly permuted with respect to that one occurring for signals at the corresponding input 17 from the third one of said signal terminals 11. That is, the second output sequence would have the representations occurring at terminals 19 in the same order as they did in the first output sequence, but each cycle of the repeating sequence would begin and end on different ones of interrupt controller output terminals 19.

Figure 3A:
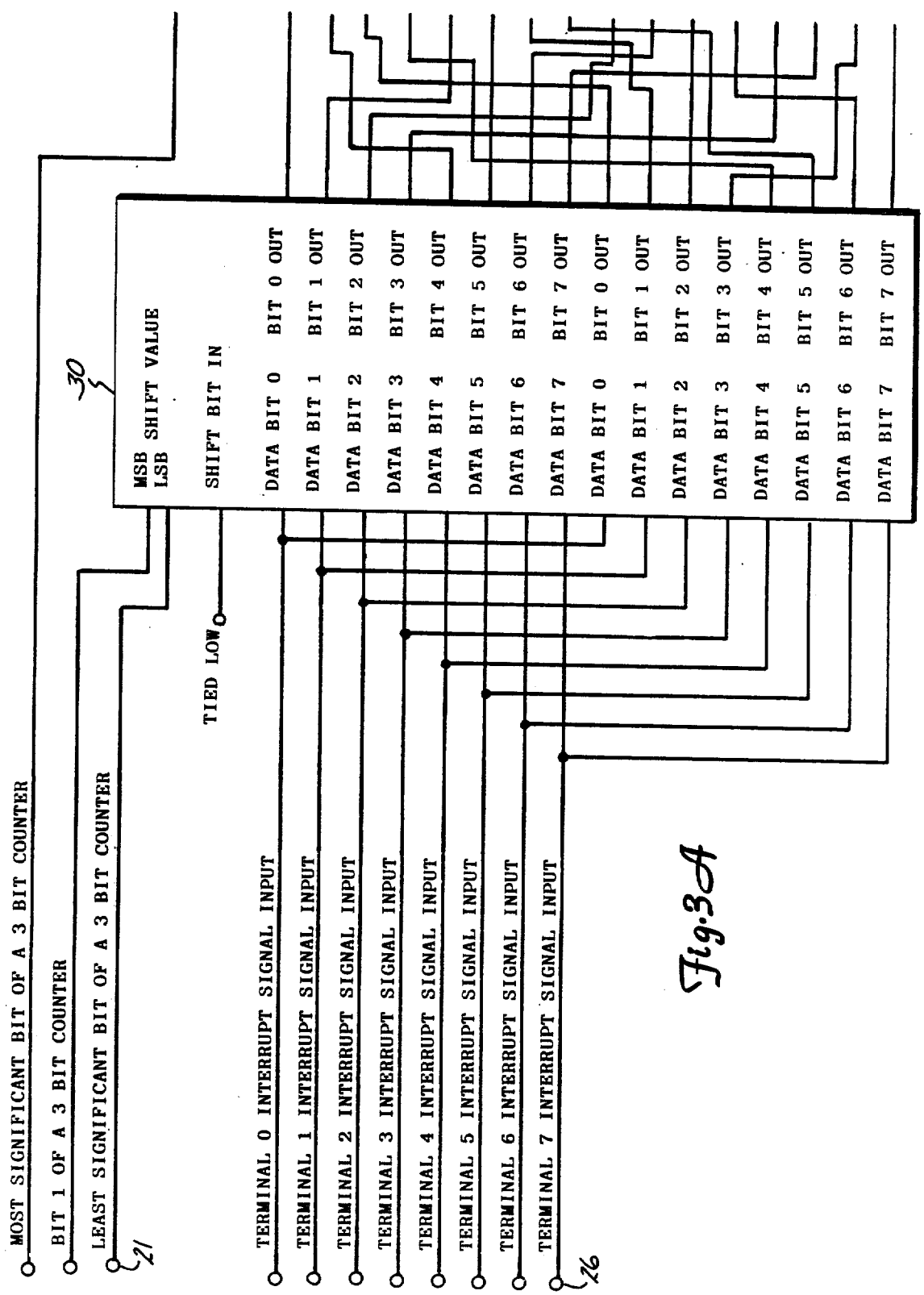
Figure 3B:
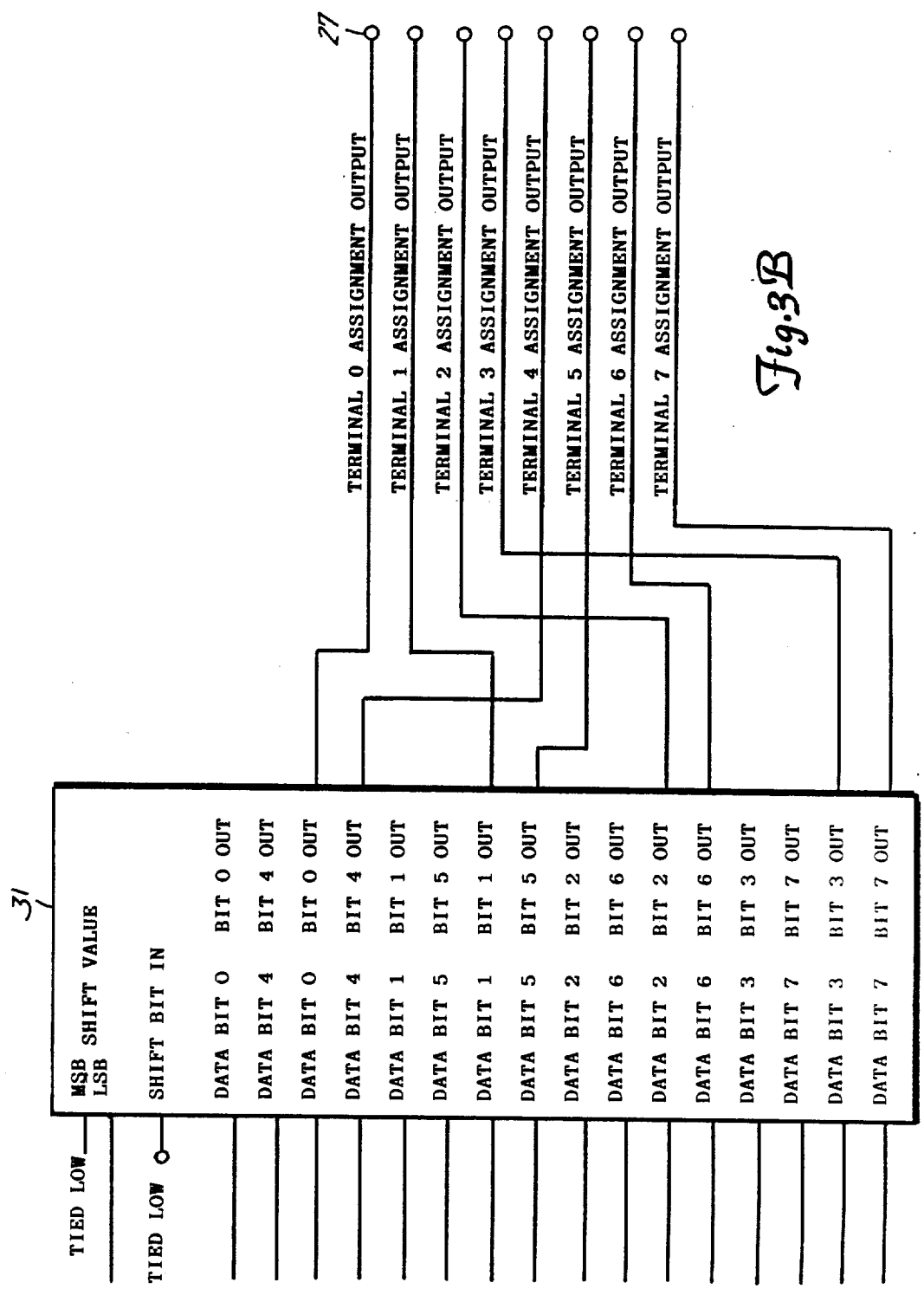

Interrupt controller shifter 25 is shown in more detail in FIGS. 3A and 3B for an example of having N being equal to eight. That is, there will be eight signal terminal 11 means in the interrupt notice system, eight shift positions in shifter 25, and eight assignment states all numbered 1 through 7. The interconnections at the right of FIG. 3A are directly continued at the left of FIG. 3B. The implementation for shifter 25 shown in FIGS. 3A and 3B is based, generally, on the cascading of shifters capable of shifting four shift positions, each of which has sixteen inputs to receive signals for shifting, and sixteen outputs at which to provide the shifted input signals as output signals. Each also has a shift bit input used in other arrangements as a feedback input for circular shifting. Further inputs are provided at which signals are provided to specify the number of shifts to be performed in each shifting operation, the possibilities being shifts of any of 0, 1, 2, or 3 shift positions.

There are two such subsystem shifters, 30 and 31, shown in FIGS. 3A and 3B as comprising interrupt controller shifter 25. These two subsystem shifters are sufficient to permit N to equal 16 if desired, but are shown only for purposes of implementing the example arrangement of N being equal to eight. Subsystem shifters 30 and 31 are identical to one another in interior circuit construction, but it is the manner of interconnecting various inputs and outputs that leads to the desired function for interrupt controller shifter 25. Further ones of shifter subsystems like 30 and 31 could be added to the cascade formed by these two to provide even greater numbers of shift position possibilities. Such cascades of shifters like these provide relatively fast shifting operations. Each of subsystem shifters 30 and 31 give effect to a specified shift by providing a conductive path from each of its Data bit input positions to a corresponding Data bit output position, if any, with a number equal to that of the Data input position from which the path begins plus the number of shifts specified.

Each of input terminals 26 is connected to two different inputs along the input side of subsystem shifter 30 which are separated by eight positions from one another. For a system of N being equal to eight, counter 20 must provide three bits in its state count since one state is required for each signal terminal 11 present and the number of count digits, n, that will be required will be $2^n \leq N$. The two least significant bits of each state count are provided to subsystem shifter 30 to specify the number of shift positions to be shifted therein in each assignment state, 0, 1, 2 or 3. The most significant bit of each state count is supplied to subsystem shifter 31 to determine the number of shift positions to be shifted therein in each assignment state, just 0 or 1 since there will be only N total shift positions.

By having all of inputs 26 represented in two tiers in sequential order along the input of subsystem shifter 30, the outputs of shifter 30 will always be correct from the upper tier Data bit 3 position output down through the lower tier Data bit 7 position output without the need of any feedback arrangement to shift any data bits at the lower tier outputs back to higher inputs. That is, each Data bit 0 input position in shifter 30 can have signals shifted therefrom the maximum of three shift positions to then be correspondingly in each of the Data bit 3 output positions. A smaller shift specified by the state count bits coming into shifter 30 would lead to signals on the Data bit input positions appearing at Data bit 0 output positions, the Data bit 1 output positions, or the Data bit 2 output positions. Similar results will be obtained for each of the other data bit positions in shifter 30. Shifter 30 is primarily responsible for any shifts of from zero to three shift positions.

Shifter 31 passes through the shifts from shifter 30, or provides for shifts of four plus any of the shifts pecified in shifter 30. The inputs in shifter 30 are grouped in repeated pairs with each pair member being four positions apart from the other as arranged by the choice of interconnections from the outputs of shifter 30 to the inputs of shifter 31. There is only one state count, the most significant bit, coming into shifter 31 at its least significant bit input position. Thus, this count digit permits a shift of just zero or one position. However, because of the choice of interconnections between shifter 30 and shifter 31, the effect is to have shifter 31 pass through shifts of 0, 1, 2 or 3 positions, or to permit shifts of 4, 5, 6 or 7 positions.

Thus, if a shift of incoming signals at inputs 26 of two shift positions is specified in shifter 30, a specified zero shift in shifter 31 of incoming signals from shifter 30 provided to the inputs of shifter 31 will lead to a shift of just two positions at outputs 27 versus the relative position of the original incoming signals at inputs 26. On the other hand, a specified shift of one instead for shifter 31 will lead to a shift of six positions at outputs 27 for the same shift of two positions in shifter 30 relative to positions of the original incoming signals on inputs 26.

This result can be seen in more detail through an example by noting, for the example, that a signal provided at the Data bit 2 input position of shifter 30, with a specified shift of two, would then be presented at the Data bit 4 output position of shifter 30. The Data bit 4 output positions at shifter 30 are each connected to a Data bit 4 input position in shifter 31. A zero shift in shifter 31 will lead to signals being presented to a Data bit 4 output position from incoming signals at a Data bit 4 input position in that shifter so that the two shifts occurring in shifter 30 will be reflected on that output 27 marked Terminal 4 assignment output. On the other hand, if shifter 31 is directed by the most significant bit of the state count to provide a position shift of four, in effect although just one actually in the shifter itself, then the signal from the Data bit 4 output position in shifter 30, provided to the Data bit 4 input position in shifter 31, will lead to shifts resulting in signals being presented to a Data bit 0 output position in shifter 31 to appear at the corresponding Terminal 0 assignment output of outputs 27.

Figure 4:
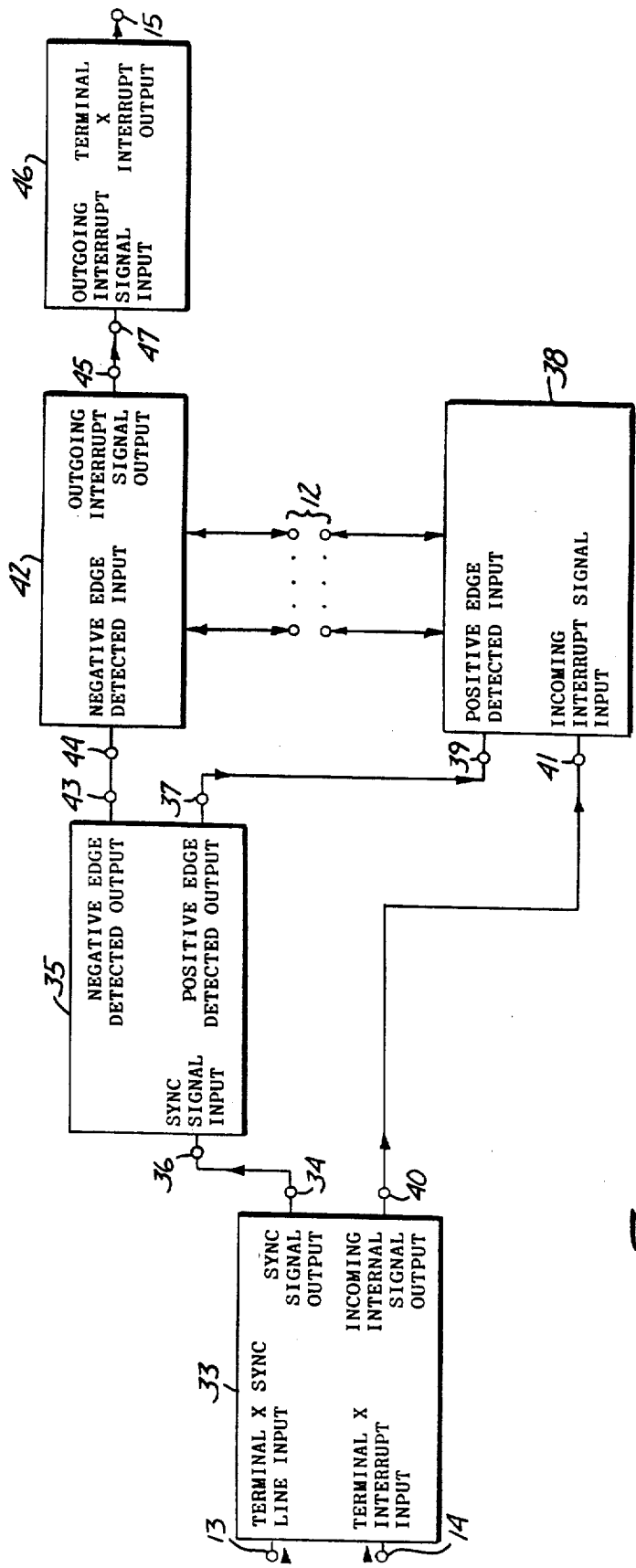
FIG. 4 is a diagrammatic representation of a portion of the present invention shown in FIG. 1, FIGS. 5A and 5B are right hand and left hand parts of a diagrammatic representation of a portion of the present invention shown in FIG. 2A, FIGS. 6A, 6B, and 6C are waveforms representing operation of the present invention.

Before returning to FIGS. 2A and 2B, consider FIG. 4 showing in block diagram form the arrangement within a signal terminal 11. Each signal terminal 11 has a signal terminal input register, 33, having a Terminal x sync line input 13 and a Terminal x interrupt input 14. Signals provided during an assignment state come into these inputs and are held in register 33 during the subsequent assignment state. They are then available at outputs, 34, of signal terminal input register 33.

A signal on the sync signal input 13 is transmitted through register 33 with its delay to output 34 thereof, and on to a detection means, 35, at its sync signal input, 36. Detection means 35 determines in a further assignment state whether there has been a negative edge in the waveform of the signal on sync signal input 13 or a positive edge, or neither.

A positive edge detection indication is provided at Positive edge detected output, 37, of detection means 35 where it is communicated to a receive interrupt logic interface module, 38, at its Positive edge detected input, 39. An incoming interrupt signal provided to interrupt input 14 is held in register 33 for one assignment state and then provided on another output, 40, of input register 33 designated sync signal output. From there, the interrupt signal is brought to an input, 41, of logic module 38 labeled Incoming interrupt signal input.

The receipt of such a positive edge detected indication at input 39 of module 38 provides that module with the information as to the relative timing of any interrupt signals coming to input 14 of this signal terminal 11 in the interrupt notice system as a basis for determining which of the signal terminals 11 has sent any particular interrupt signal. This module 38 is also the place for the terminal to acquire any incoming interrupt signals as a basis for providing an indication thereof to any operating device connected to this terminal through interconnections 12 that an interrupt notice has been received and which terminal sent it.

A transmit interrupt logic interface module, 42, receives any negative edge detected signal provided at a Negative edge detected output, 43, of detection means 35 which is communicated to an input, 44, of module 42. Such a negative edge detected signal indicates the relative timing occurring in said interrupt notice system to provide a basis for an operating device 10 connected to terminals 12 to initiate interrupt signals to interrupt other operating devices in a manner coordinated with the system timing situation. That operating device can then have module 42 initiate an outgoing interrupt signal at its Outgoing interrupt signal output, 45, which is brought to a signal terminal 11 output register, 46, at an Output interrupt signal input thereof, 47. After holding this indication for one assignment state, output register 46 provides it as an output interrupt signal at the corresponding Terminal x interrupt output 15.

Note that it takes two assignment states for an interrupt signal coming into a signal terminal 11 to be indicated to any operating device 10 connected thereto at module 38. One assignment state is spent in input register 33 and another in detection means 35 before there is an indication to a connected operating device 10 that an interrupt signal has been received. On the other hand, once that operating device 10 acts to interrupt another operating device, that indication is provided to interrupt logic module 42 which passes it to output register 46 where it is held for one assignment state.

Thus, if an operating device 10 intends to transmit an interrupt to itself or another, five assignment states will pass, forming the interrupt system total transmission delay, before that interrupt notice is indicated to such a destination operating device. One assignment state will be taken up in the transmitting terminal 11 output register 46 after the operating device connected to that terminal has provided an indication to transmit an interrupt. As indicated earlier, two assignment states will be used up in going through interrupt controller 16 as the transmission delay therethrough, one in its input register 23 and the other in its output register 28. Finally, there will be one assignment state used in input register 33 of the receiving signal terminal 11, and one further state used in edge detection means 35 in that receiving terminal to determine the presence and source of an interrupt signal before an interrupt is received in receive logic module 38 for passing an indication thereof to the operating device 10 connected thereto through interconnections 12. Differing system components or designs, or different operating arrangements, could increase or decrease the number of assignment states occurring in the system total transmission delay.

Returning now to FIGS. 2A and 2B, counter 20 provides the state counts at outputs 21 thereof also to a synchronizing signal generator, 50, at inputs, 51, thereof to cause a succession of synchronizing states therein each of which corresponds to an assignment state ocurring in interrupt controller 16. Synchronizing generator 50 provides at its Terminal x sync signal outputs, 52, terminal sync signals each having two state levels for transmission to a synchronizing output register, 53, at inputs, 54, thereof. After one assignment state, these sync signals are provided at Terminal x sync outputs 18 of interrupt controller 16.

The two states in each sync signal are spread over N assignment states and so the N corresponding synchronizing states. However, the state levels themselves are not what is detected but rather the rising and falling edges which indicate a change between states, these being detected in the detection means 35 shown in FIG. 4 of each signal terminal 11.

The positive or rising edge of a sync signal state change in one direction is used to indicate to a signal terminal 11 receiving same that it should be ready to receive and accept an interrupt from a selected signal terminal 11. The negative or falling edge of a sync signal state change in the other direction is used to indicate to a receiving signal terminal 11 that it should be ready to transmit an interrupt to a selected signal terminal 11. These selected signal terminals can be arbitrarily chosen from the N of them available, but the zeroth one of signal terminals 11 in the input connection order to interrupt controller 16 seems like a natural choice.

Thus, the negative or falling edge of a sync signal state change transmitted to each signal terminal 11, during one corresponding assignment state in each cycle of N assignment states, is provided to that signal terminal in the state during which it must transmit an interrupt signal, if any, for that interrupt to reach the zeroth one of signal terminals 11 in any cycle. Transmitting an interrupt signal from a particular signal terminal 11 in time sufficient for it to reach the zeroth one of signal terminals 11 through shifter 25 of interrupt controller 16 implies a requirement on the time of transmission. The requirement is that the interrupt signal from the particular terminal must be at a corresponding one of outputs 24 of input interface 23 of interrupt controller 16 in the assignment state that a state count from counter 20 causes shifter 25 to shift sufficiently to provide that transmitted interrupt signal, or a representation thereof, at the zeroth one of signal terminals 11.

For this requirement to be consistently met, the transmitting signal terminal 11 must begin transmission of the interrupt signal prior to that assignment state in which the signal therefrom, or a representation thereof, will be transmitted by shifter 25 to the zeroth one of signal terminals 11 because of (a) the assignment state taken up in output register 46 of the transmitting signal terminal, and (b) the assignment state taken up in the input register 23 of interrupt controller 16. Thus, every interrupt signal must be provided by a transmitting signal terminal 11 two assignment states before that assignment state in which the signal transmitted, or its representation, will be shifted from its corresponding signal line at the input of shifter 25 to be presented to the output interconnection from shifter 25 corresponding to the zeroth one of signal terminals 11.

From FIGS. 2A and 2B, and from FIGS. 3A and 3B, one can see that each transmitting signal terminal 11 should transmit its interrupt signal destined for the zeroth one of terminals 11, if it chooses to interrupt that zeroth terminal, in that assignment state sufficient shifts in shifter 25 so that an earlier interrupt signal transmitted from that terminal, if any, or a representation thereof, is now being presented to the Data bit output position corresponding to the N-$2^{nd}$ signal terminal 11. If that is done, then in two further assignment states there will be sufficient shifts in shifter 25 for this latest interrupt signal to reach the zeroth one of the signal terminals 11.

Note that the N-$2^{nd}$ signal terminal 11 in the input connection order will be at this condition in an assignment state having no shifts occurring in it at all so that a negative edge should go out from sync generator 50 to reach the N-$2^{nd}$ signal terminal 11 in a zero value state count assignment state (the reference state indicated above). In the next assignment state in which there is a one position shift by shifter 25, the signal terminal 11 corresponding to the N-$3^{rd}$ input connection of shifter 25 will be two assignment states away from having sufficient shifts to be able to provide a transmitted interrupt signal, or its representation, to the zeroth one of signal terminals 11. That is, the N-$3^{rd}$ terminal can have a signal therefrom, or its representation, in this one position shift assignment state presented to the N-$2^{nd}$ Data bit output position of shifter 25. Thus, the N-$3^{rd}$ terminal should receive a negative edge from generator 50 in this assignment state.

Similarly, the next signal terminal 11 in the next succeeding assignment state which can provide an interrupt signal, or its representation, to the N-$2^{nd}$ Data bit output position of shifter 25 will be the one connected to the one corresponding to the N-$4^{th}$ connection to shifter 25 because of two shifts occurring in that state, and so on. As can therefore be seen, successive negative edges are to be sent from sync generator 50 to the signal terminals 11 in an order that is the reverse of the input order connection to interrupt controller 16.

The positive edge for each sync signal from sync generator 50 can be chosen to be sent at the time that each signal terminal 11 can expect to receive and accept an interrupt from the zeroth one of signal terminals 11. That can occur for a particular terminal 11 as a receiver only in those assignment states corresponding to sufficient shifts in shifter 25 such that the zeroth one of signal terminals 11 could transmit interrupt signals therefrom which would permit that interrupt signal, or its representation, to be presented to the Data bit output position of shifter 25 corresponding to that particular signal terminal 11. Thus, the zeroth one of signal terminals 11 can initiate the transmission of an interrupt signal therefrom to a particular signal terminal 11 by beginning the transmission of that signal two assignment states (again because of the delays through register 46 and 23) before shifter 25 has provided enough shifts from the connection corresponding to the zeroth one of signal terminals 11 to present the signal, or its representation, to that Data bit output position of shifter 25 corresponding to the particular one of signal terminals 11. Therefore, this terminal should receive a positive edge from sync generator 50 in the third assignment state (reaching register 53 after delays through registers 46, 23 and 28) following this state of initiation which is the state at which the transmitted signal, or its representation, is in the input register 33 of that terminal 11.

In the next assignment state after the previous state in which an interrupt signal could have been initiated in the zeroth one of terminals 11 to reach a particular terminal, another interrupt signal can be transmitted by the zeroth one of signal terminals 11. This interrupt signal, or representation thereof, can be provided by shifter 25 to the Data bit output position corresponding to the next one of signal terminals 11 in the input connection order after the last particular receiving terminal. A positive edge should be provided to that terminal by generator 50 in the third assignment state following thereafter. Similarly, the signals from the zeroth one of signal terminals 11 can be transmitted to succeeding ones in input connection order of signal terminals 11. Thus, successive positive edges will be trnsmitted from synchronizing generator 50 to signal terminals 11 in an order that follows the input connection order to-interrupt controller 16.

Figure 5A:
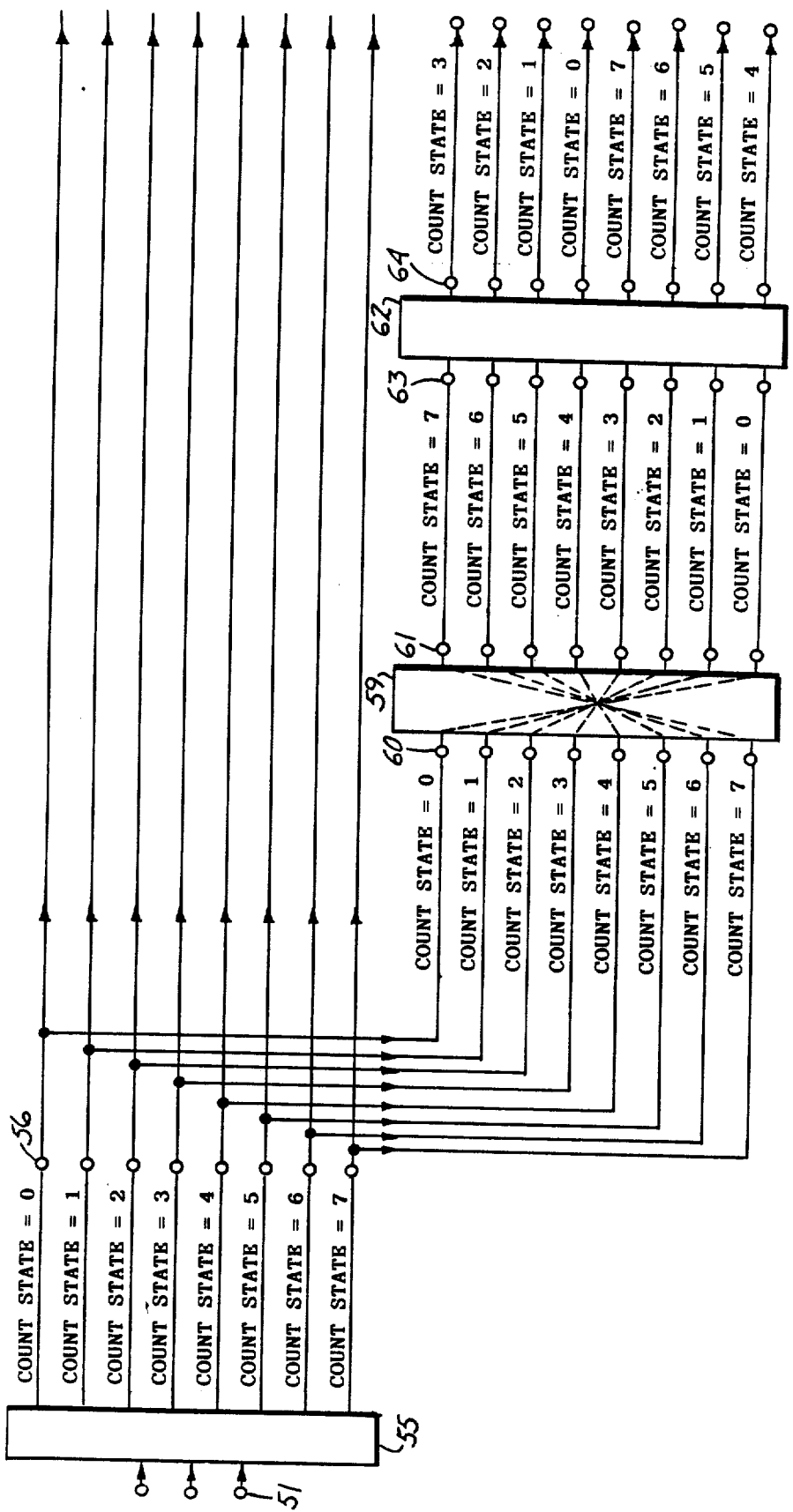
Figure 5B:
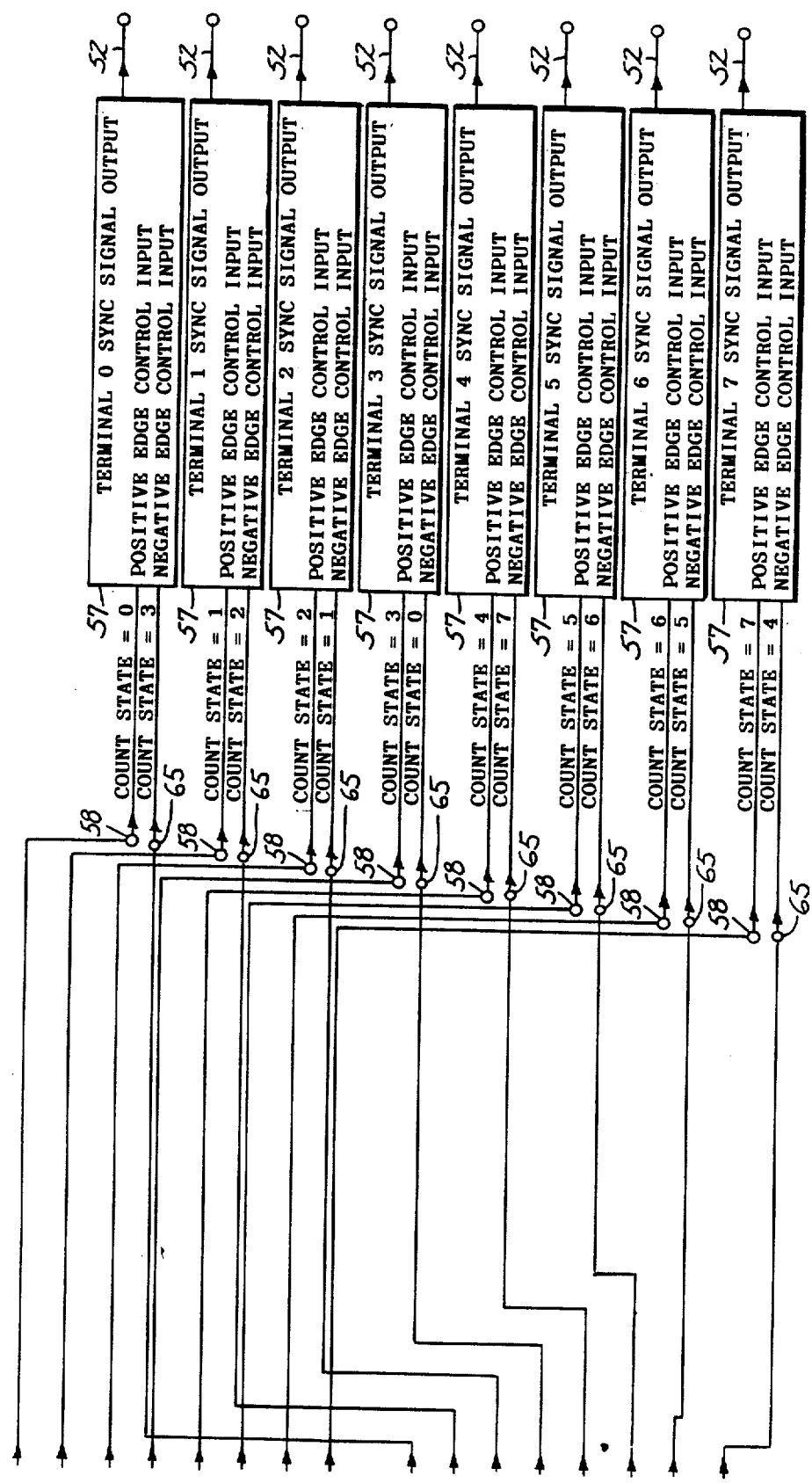

A more detailed block diagram of synchronizing generator 50 is shown in FIGS. 5A and 5B with the interconnections at the right of FIG. 5A being directly continued at the left in FIG. 5B. State counts come into inputs 51 of synchronizing generator 50. Three inputs are shown, because generator 50 will be described through again using an example where N equals eight. A decoder, 55, decodes these state counts and provides a separate count state output signal at each decoder output, 56, for each binary count or count state provided by counter 20. Logic drivers, 57, are shown with each providing a rising and falling edge signal, or two state level signals, for a corresponding signal terminal 11 at its corresponding one of synchronizing generator outputs 52. Thus, there are N such logic drivers 57.

Each of decoder outputs 56 is electrically connected to one of the N logic drivers 57 at its positive edge control input, 58. The successive count state signals thereby set the order of providing the rising edges by logic drivers 57 which follows the arrangement described above. Each of decoder outputs 56 is also electrically connected to an order reversing arrangement, 59, at inputs, 60, thereof which acts to reverse the incoming count state signal order through reversing the order of the interconnection lines from decoder outputs 56 coming into inputs 60. This reverse set of interconnection lines is provided at the outputs, 61, of order reversing arrangement 59 which is indicated by crossed lines shown within the block representing output reversing arrangement 59.

These signals are provided to a further synchronizing shifter, 62, at inputs, 63, thereof. Shifter 62 shifts the count state signals four positions and provides them at outputs, 64, thereof. This is done by shifter 62 providing a conductive path from an input 63 to an output 64 four positions further along in the reverse order, i.e. circularly permutes these signals four positions from the input position order. Four shifted positions work out properly for the present example because of the total of N count lines and the fact of the passing of five assignment states after the initiation of transmission before a transmitted interrupt signal can be detected in the signal terminal 11 to which this signal is intended to give notice of interruption.

The outputs of shifter 62 are then electrically connected to negative edge control inputs, 65, of logic drivers 57. Thus, the reverse of the order of count states controls the provision of falling edges in logic drivers 57 in accord with the description above. As can be seen, each count state sets a synchronizing state for synchronizing generator 50 in conjunction with its setting the assignment state for interrupt controller 16 as a whole, including the shift state for shifter 25 in particular. Count state based signals at inputs 58 and 65 of each of logic drivers 57 lead to the two state level signals occurring at output 52 and the rising and falling negative edges at the transitions between these state levels. One rising edge and one falling edge are transmitted by logic drivers 57 in each assignment or synchronizing state.

As stated before, the total transmission delay in the example being used where N=8 was equivalent to five assignment states. Any such system as described here must use an odd number of assignment states for the total transmission delay in the system because this controls the amount of shift required in synchronizing shifter 62 since the transmission delay determines when the falling edges must occur relative to the rising edges. An odd number of shifts by shifter 62 will lead to certain of logic drivers 57 attempting to provide both a rising edge and a falling edge in the same assignment state which has the effect of these edges more or less canceling each other out. Such a cancellation would leave the signal terminal 11 corresponding thereto without synchronizing signals.

Figure 6A:
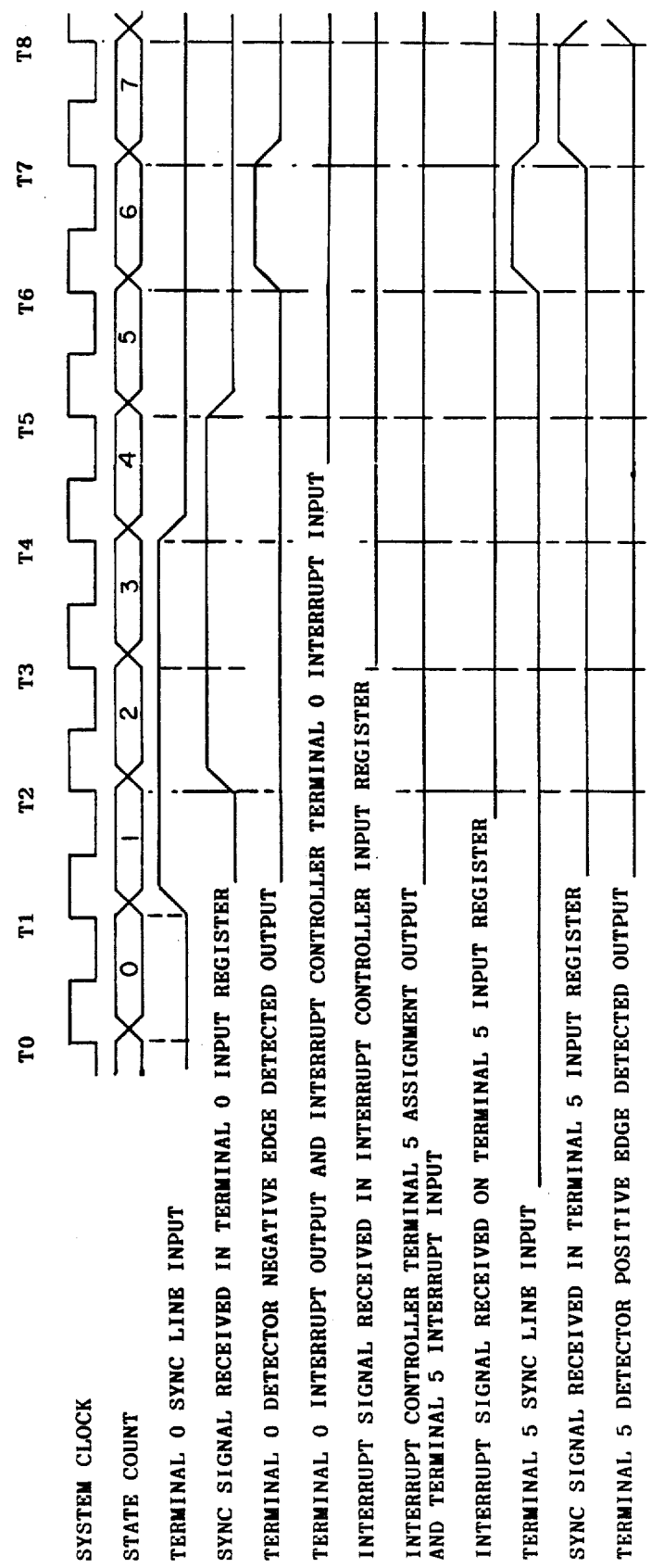
Figure 6B:
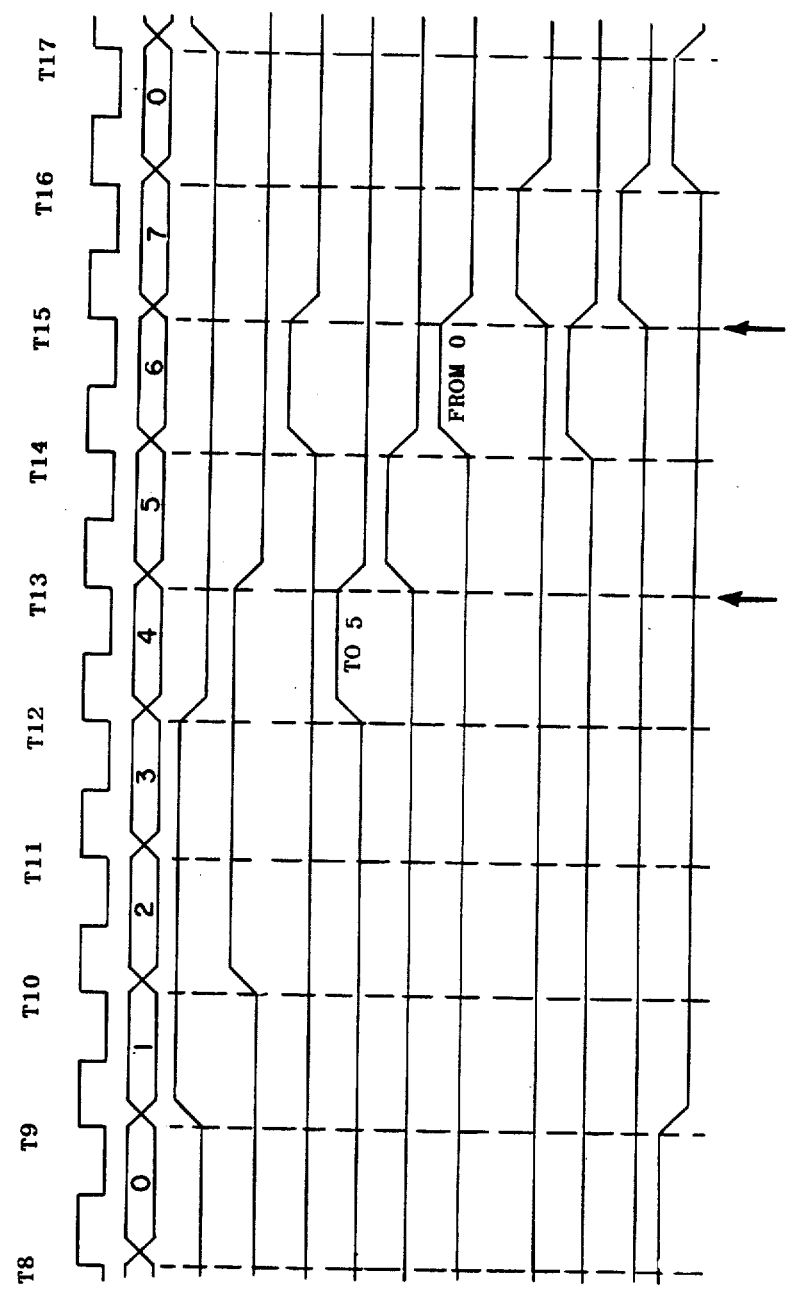
Figure 6C:
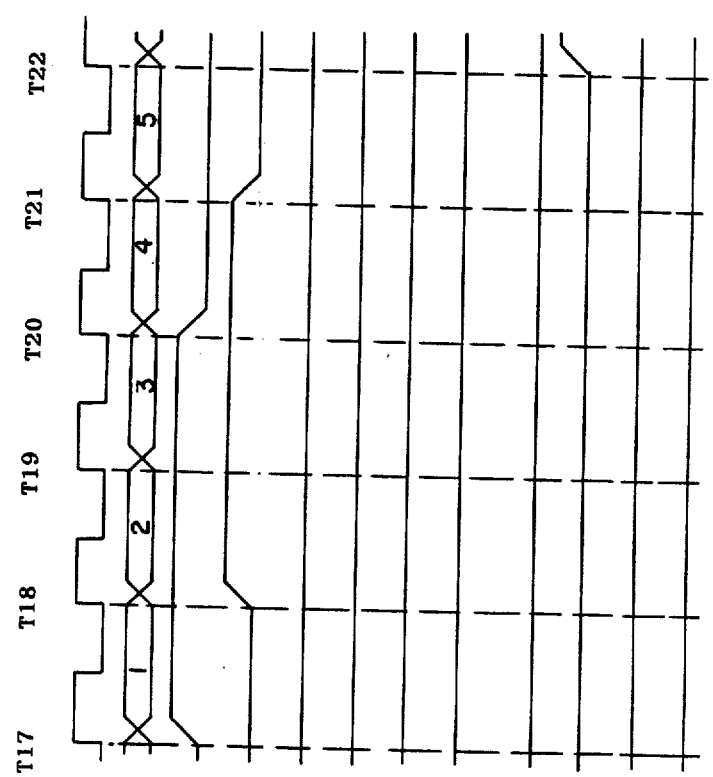
Figure 7A:
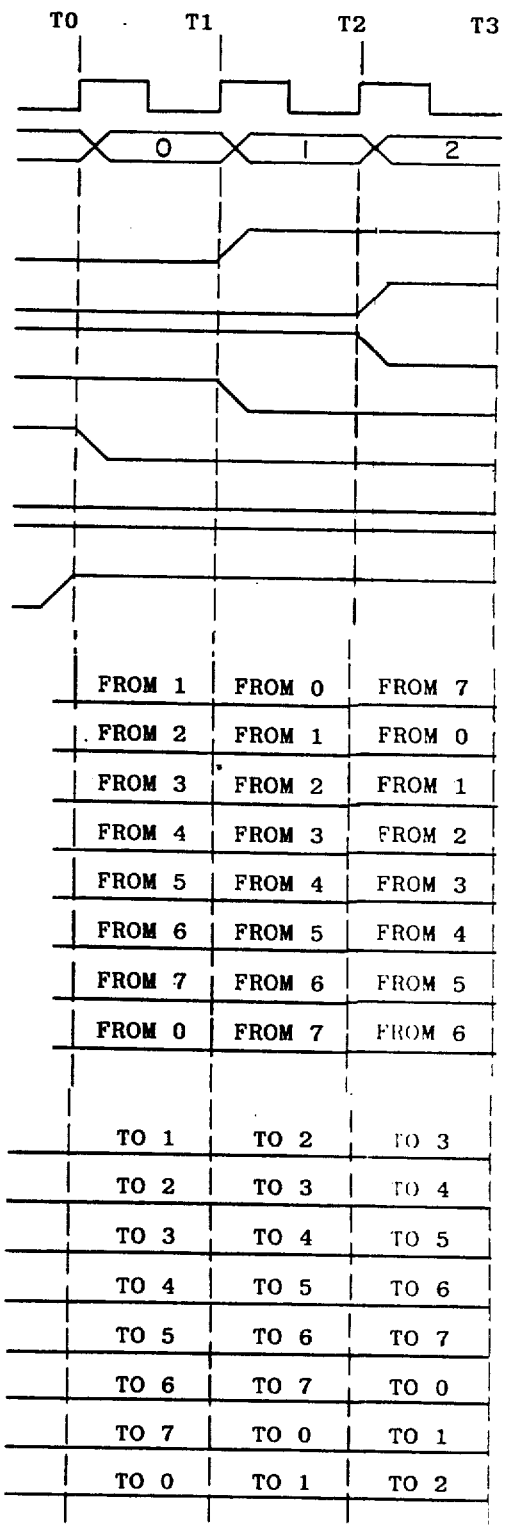
FIGS. 7A, 7B, 7C and 7D are waveforms on a timing diagram representing operation of the present invention.
Figure 7B:
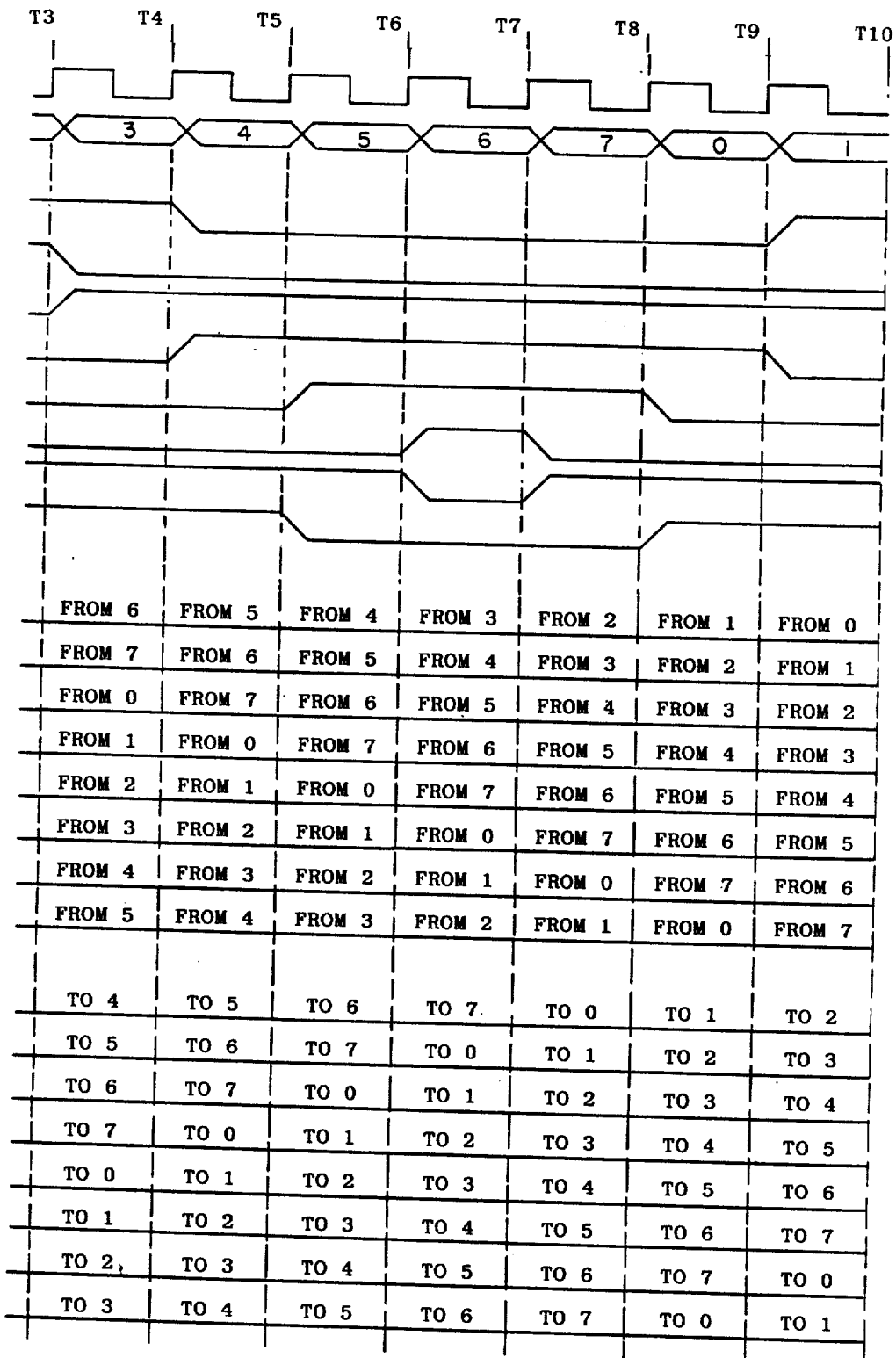
Figure 7C:
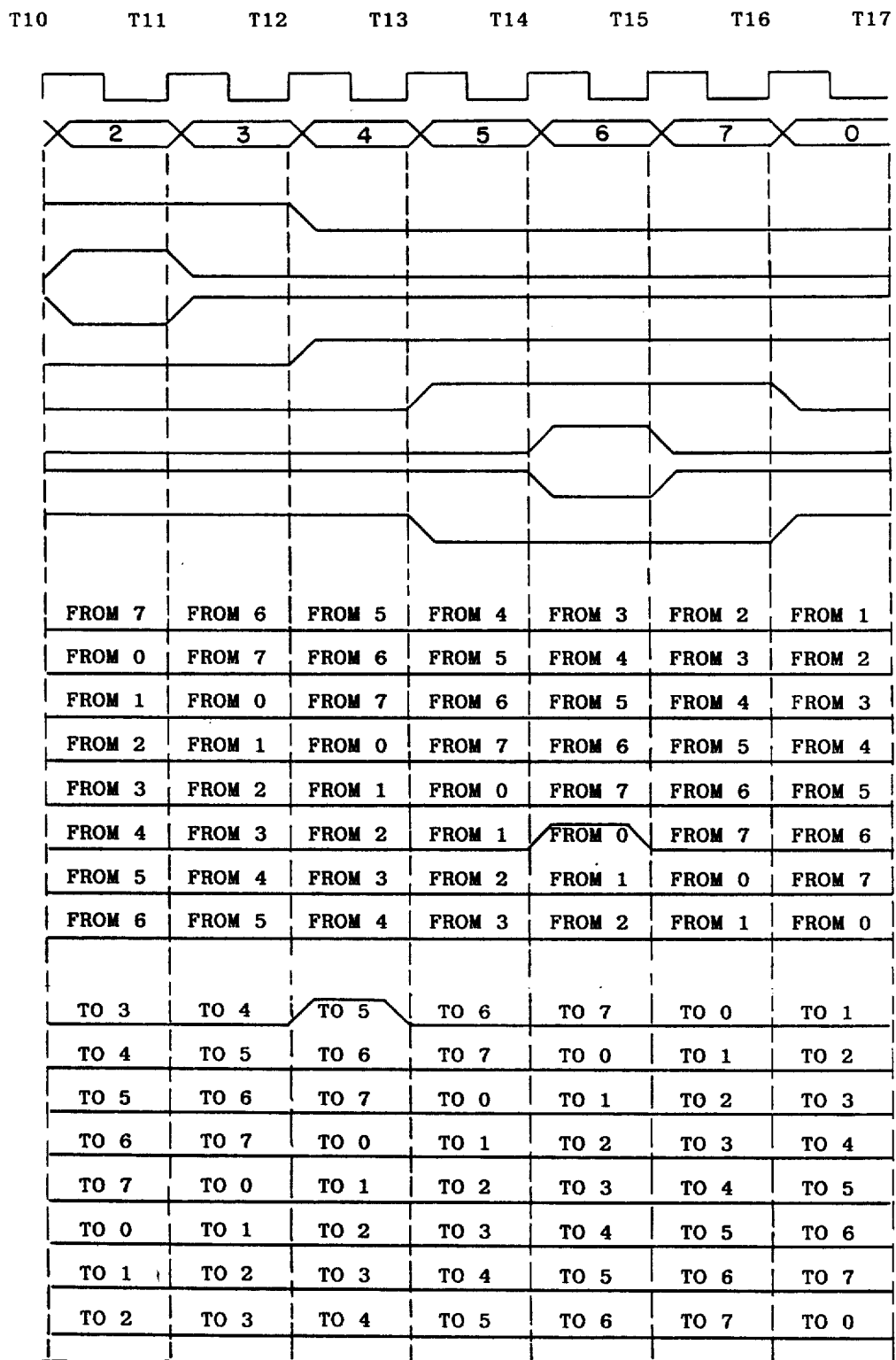
Figure 7D:
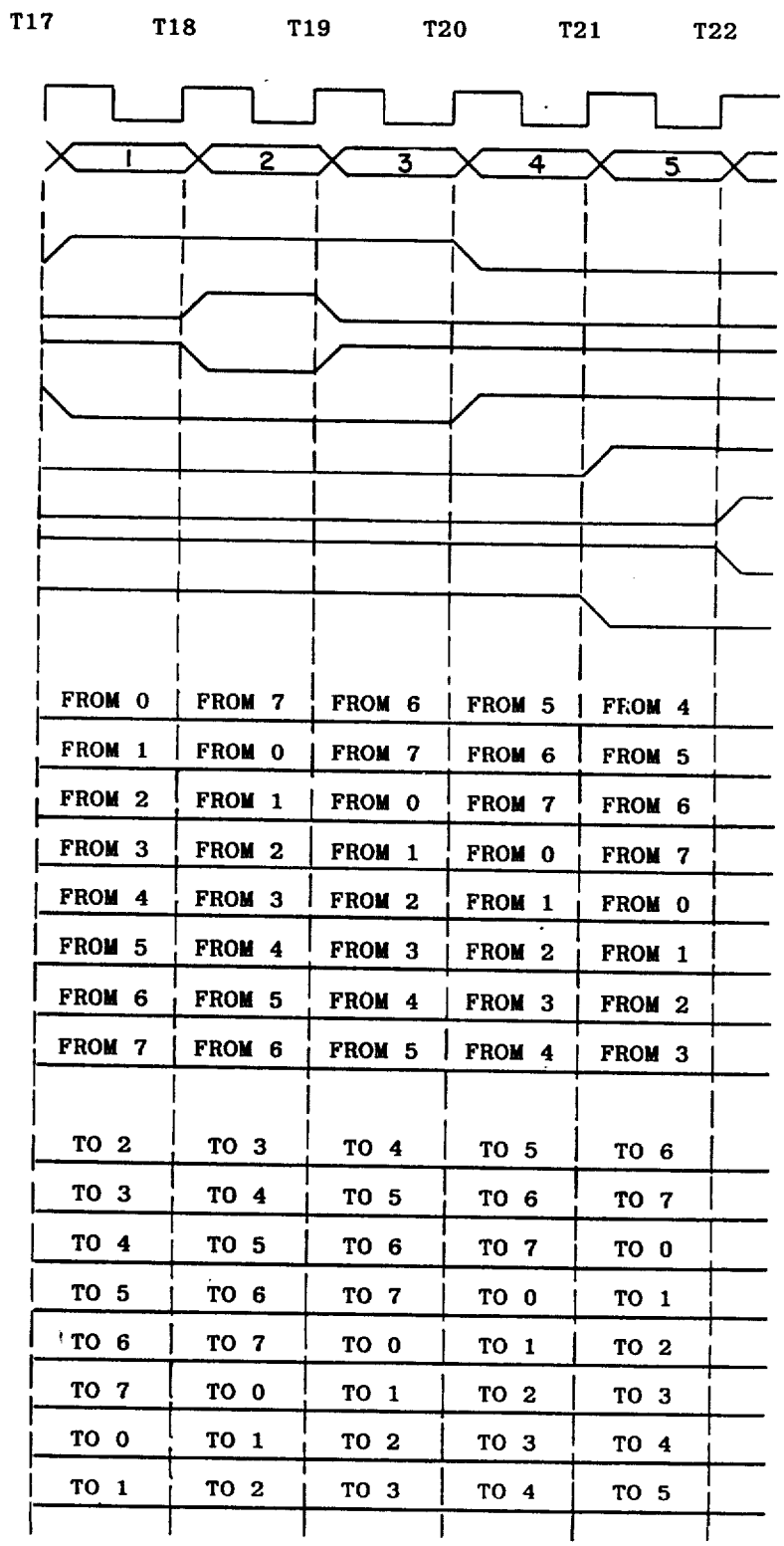

An example of the transmission of an interrupt signal for the system of FIG. 1 has the waveforms therefor presented in FIGS. 6A, 6B and 6C. This example is again based on using, as an example for the system of FIG. 1, a system having N being eight so that there are eight assignment states in a cycle thereof and eight signal terminals 11 in the system of FIG. 1. The repeated pulse waveform of the system clock are shown at the top of FIGS. 6A, 6B and 6C with each clock period, or complete pulse, designated by the symbol T followed by a number, the clock pulses so designated start with T0 followed by T1, T2, etc., across FIG. 6A, then FIG. 6B and, finally, FIG. 6C. For purposes of this example, these designations should be considered to be for relative time so that each clock cycle designation could be considered as having a preceding duration of operating time added to it based on some earlier start time reference.

The next line down is a representation of the state count, but each count for each state is provided as a decimal equivalent rather than as the binary number which would be actually generated by state counter 20. A suggestive pair of alternating amplitude level waveforms, each always at the opposite level in each clock waveform period, are shown suggesting that the various state count outputs 21 have both high level and low level signals occurring thereon.

The example chosen is for the transmission of an interrupt signal from the zeroth one of signal terminals 11 to the fifth one of signal terminals 11. Thus, the first waveform below the state count waveform is the synchronizing signal provided by interrupt controller 16 to the Terminal 0 sync line input 13 of the zeroth signal terminal 11 which is provided thereby at T1. At T2, the positive or rising edge of the sync waveform is captured in input register 33 of the zeroth signal terminal 11 as is the remainder of the high level portion of this waveform thereafter. Finally, the negative or falling edge is also captured in input register 33, and an indication thereof is made available at T5 on output 34 thereof to input 36 of detector 35. The next line shows detector 35 providing a pulse at its negative edge detected output 43 at T6 indicating a negative edge has been provided to detector 35 at its input 36.

Such a negative edge, as indicated above, provides the information that this zeroth one of signal terminals 11 should accept at this time, from an operating device 10 connected thereto, an indication, if any, to provide an interrupt pulse should that operating device need to interrupt itself. However, for purposes of this example, an interrupt signal is to be provided from this zeroth one of signal terminals 11 to the fifth one thereof rather than to itself. Thus, five assignment states must be permitted to pass at which time it will be necessary to provide an interrupt signal if the fifth one of signal terminals 11 is to have the operating device 10 connected thereto interrupted as desired for this example.

Since the pulse on the negative edge detected output of detector 35 occurred at T6, the interrupt should then be provided five assignment states later at T11. Thus, an interrupt pulse will be presented to output register 46 of the zeroth one of signal terminals 11 at T11. This pulse will be in output register 46 of the zeroth one of signal terminals 11 in the following assignment state at T12 and available on the Terminal 0 interrupt output 15 of the zeroth signal terminal 11 at T12. This pulse is shown with the designation under its high level "T 0 5".

This signal pulse at output 15 of the zeroth signal terminal 11 will be transmitted to interrupt controller 16 at its Terminal 0 interrupt signal input 17 and accepted in its input register 23 at clock period T13, where it is immediately available at its Terminal 0 interrupt signal output 24. This signal is simultaneously available to shifter 25 at its Terminal 0 interrupt signal input 26. As can be seen in FIG. 6B, with the aid of the vertical, dashed, time indicator line above the left-hand arrow shown there, this signal comes to shifter 25 at a time that the count state has a value of 5 so that the assignment state is one in which shifter 25 provides a shift of five, i.e. is in a shift state of five.

Thus, this signal is presented to the Terminal 5 assignment output 27 of shifter 25 and so to the Terminal 5 interrupt input of output register 28. This shifted signal is then made available at the Terminal 5 assignment output 19 of register 28, and so at the Terminal 5 interrupt input 14 of the fifth signal terminal 11 at clock period T14. That pulse is shown in FIG. 6B to have the words "FROM 0" below the high level portion of the pulse. In the succeeding assignment state T15, this pulse will be in the input register 33 of the fifth signal terminal 11 and available at output 40 thereof. From there it is passed on to receive logic module 38 of this fifth signal terminal 11 where it is related to the timing of a positive edge detected signal from detector 35 to determine its source.

The receipt and relating of an interrupt signal to a positive edge in the fifth one of signal terminals 11 can be seen by relating it to the sync signal provided to this terminal. The third signal from the bottom in FIGS. 6A, 6B and 6C shows the synchronizing signal from the Terminal 5 sync output 18 of interrupt controller 16 provided to the Terminal 5 sync line input 13 of input register 33 in the fifth one of signal terminals 11. This synchronizing signal has a positive edge beginning at clock period T6 which is captured in input register 33 and made available at its Incoming interrupt signal output 34 at clock period T7. Thus, it is also then immediately available at input 36 of detector 35 which provides a signal at its Positive edge detected output 37 at clock period T8 which is then simultaneously available to input 39 of receive logic module 38.

Logic module 38 is notified thereby that if it has received an interrupt signal at the time of receiving this positive edge, that such interrupt signal came from the zeroth one of signal terminals 11, which is the meaning attributed to having received a positive edge indication as described above. Further, logic module 38 has the information that, concurrent with its receiving a positive edge indication, any interrupt signal received by the fifth signal terminal 11 and present in its input register 32 came from the seventh signal terminal 11 because of the reverse order of interrupt signal transmissions.

As described above in connection with the description of the synchronizing signals, interrupts received at the N-$2^{nd}$ Data bit output of shifter 25, and so subsequently at its corresponding signal terminal 11, arrive in reverse of the input connection order. By the same reasoning, this is true of the order in which interrupt pulses are received at any signal terminal 11 including the fifth one of signal terminals 11. Since the interrupts, if any, come in such reverse order to the fifth one of signal terminals 11, that terminal through its logic module 38 can expect the interrupt signal in the next assignment state after the one in which the positive edge was received in module 38, if any, which will be in input register 33 and be from the seventh one of signal terminals 11. Logic module 38 can react to only those interrupt signals received subsequent to the receipt of a positive edge, the first of which will be this interrupt signal in input register 33 from the seventh signal terminal 11, and cannot react to a previous signal from the zeroth one of signal terminals 11 which came simultaneously, if at all, to logic module 38 with the positive edge indication.

Thus, logic module 38 also has the information that it must wait seven further assignment states before another interrupt from the zeroth one of signal terminals 11 can arrive, the timing of which can be verified against the receipt of the described positive edge indication for source recognition purposes. Therefore, that interrupt signal could arrive in input register 33, if at all, at clock period T15. Note that clock period T15 begins at the point of the vertical, dashed, time indicator line above the right-hand arrow of FIG. 6B at which simultaneously the interrupt signal described above is received in the Terminal 5 input register 33. Hence, the first positive edge in the Terminal 5 sync line input sync signal in FIG. 6A does indeed provide the information that the interrupt signal came from the zeroth one of signal trminals 11.

FIGS. 7A, 7B, 7C and 7D provide a full set of synchronzing signals below the waveforms for the system clock and the state count in the example of an interrupt system of FIG. 1 where N equals eight. Further, the clock periods or assignment states in which each of the interrupt signals must be sent to reach their planned destination, and when they are received at such destination, are shown. The example of FIGS. 6A, 6B and 6C is specifically shown in FIGS. 7A, 7B, 7C and 7D by showing where the two pulse waveforms designated "TO 5" and "FROM 0" of FIG. 6B occur in FIG. 7C. Thus, the notation "TO x" indicates when the terminal associated with that horizontal line must provide an interrupt signal if it is to interrupt Terminal x. The designation "FROM x" means that if Terminal x has sent an interrupt signal to interrupt the port associated with the horizontal line, that interrupt signal would be received by the terminal associated with the horizontal line at that time.

The waveforms and indicated times in FIGS. 7A, 7B, 7C and 7D are again associated with an example in which N equals 8. However, the present invention is not limited to any specific numerical value for N and, as indicated above, achieves it advantages to a greater degree the larger the value of N. A system where N has been extended to be as large as forty-eight has been found to operate satisfactorily. Space limitations prohibit an attempt to provide here the waveforms for such a system, but they would be a straightforward extension of those shown in connection with the above description. Although the present invention has been described with reference to preferred embodiments, workers skilled in the art will recognize that changes may be made in form and detail without departing from the spirit and scope of the invention.

What is claimed is:

1. An interrupt notice system permitting individual ones of a plurality of operating devices provided in a cooperative arrangement thereof, to indicate to others in that arrangement that procedures to interrupt operations of such others are being initiated, said system comprising:

a plurality of signal terminal means to each of which a corresponding one of said operating devices can be electrically connected, and with each of said signal terminal means being capable of receiving signals at a receive input thereof for indicating to any said operating device corresponding thereto that another of said plurality of operating devices, if any, is initiating procedures to interrupt operation of that corresponding said operating device, and each of said signal terminal means being capable of transmitting signals at a transmit output thereof from any said operating device corresponding thereto for being conveyed to others of said plurality of signal terminal means indicating that procedures are being initiated to interrupt operations of each operating device corresponding thereto, if any;

a signal assigner means having a plurality of inputs at each of which one of said plurality of operating device signal terminal means is electrically connected at its said transmit output, and having a plurality of outputs at each of which one of said plurality of operating device signal terminal means is electrically connected at its said receive input, said signal assigner means being capable of providing response signals at successive ones of said signal assigner means outputs, thereby forming a first output sequence of successive output response signals, with there being one of said output response signals provided at each said signal assigner output for each corresponding assignment state taken by said signal assigner means, thereby forming a corresponding first state sequence of successive assignment states, where such a said first output sequence of response signals occurs if signals are present on a selected one of said signal assigner means inputs sufficiently preceding each said assignment state occurring in said first state sequence to permit that corresponding output response signal to occur; and a synchronization means having a plurality of outputs at each of which one of said plurality of operating device signal terminal means is electrically connected at an indication input thereof, said synchronization means being capable of providing a receive indication to each of said plurality of operating device signal terminal means during a corresponding one of said assignment states taken by said signal assigner means in said first state sequence indicating that each, after receiving its receive indication, is to be ready to receive in a subsequent assignment state an output response signal from its corresponding said signal assigner output which occurs, if it occurs at all, in response to a signal selectively transmitted by a first selected one of said plurality of operating device signal terminal means to its corresponding signal assigner input, and being capable of providing a further transmit indication to each of said plurality of operating device signal terminal means during a corresponding one of said assignment states taken by said signal assigner means in said first state sequence indicating that each, after receiving its transmit indication, can selectively transmit a signal to its corresponding said signal assigner input which will result in said signal assigner means providing signals to a second selected one of said plurality of operating device signal terminal means in a subsequent assignment state.

2. The apparatus of claim 1 wherein each said signal terminal means has an indication detection means having an input serving as said indication input thereof at which said receive indications and said transmit indications can be received and having first and second outputs, said indication detection means being capable of providing a signal on said indication detection means first output if a said receive indication has been received at said indication detection means input, and of providing a signal on said indication detection means second output if a transmit indication has been received at said indication detection means input.

3. The apparatus of claim 1 wherein said system further comprises a cyclical state setting means having an output, said cyclical state setting means being capable of providing at said cyclical state setting means output a repeating sequence of N successive, different state determination signals, and wherein said signal assigner means has a state determination input electrically connected to said cyclical state setting means output with each different said state determination signal placing said signal assigner means in a corresponding said assignment state, and wherein said synchronization means has a state determination input electrically connected to said cyclical state setting means output with each different said state determination signal placing said synchronization means in a synchronization state corresponding to that assignment state occurring in said signal assigner means also caused by that said state determination signal, said synchronization means providing both a said receive indication and a said transmit indication for each said synchronization state.

4. The apparatus of claim 1 wherein said signal assigner means is capable of providing output response signals at successive ones of said signal assigner means outputs in a second output sequence, which is a first circular permutation of said first output sequence, for each corresponding assignment state taken thereby in a second state sequence of such assignment states, which is that sequence resulting from applying said first circular permutation to said first state sequence, where such output response signals occur if signals are present on another selected one of said signal assigner means inputs during each said assignment state occurring in said second state sequence.

5. The apparatus of claim 1 wherein an odd number of assignment states is required for a selected said operating device signal terminal means to provide a signal to its signal assigner means input followed by said signal assigner means providing a corresponding output response signal at a signal assigner means output, and thereafter followed by a said operating device signal terminal means receiving and completing its response to that said response signal.

6. The apparatus of claim 1 wherein said signal assigner means comprises a signal shifter having signal shifter inputs serving as said signal assigner means inputs and having signal shifter outputs serving as said signal assigner means outputs, said signal shifter being capable, beginning in one of said assignment states in said first state sequence, of receiving signals from each said operating device signal terminal means transmit output at its corresponding said signal shifter input and providing such received signals at each said signal shifter input, without shift, to that said signal shifter output which is connected to said receive input of that same said operating device signal terminal means providing such required signals, and being further capable, beginning in that next succeeding assignment state in said first state sequence, of receiving signals from each said operating device signal terminal means transmit output at its corresponding said signal shifter input and providing such received signals at each said signal shifter input, now shifted, to that said signal shifter output which provided response signal outputs next in succession in said first output sequence after that signal shifter output to which signals were provided without shift as aforesaid, and said signal shifter being further capable, beginning in each successive assignment state thereafter in said first state sequence, of receiving signals from each said operating device signal terminal means transmit output at its corresponding said signal shifter input and shifting them to that said signal shifter output which provided response signal outputs next in succession in said first output sequence after that said signal shifter output which provided an output response signal in that assignment state just past.

7. The apparatus of claim 2 wherein each said signal terminal means further comprises a receive interrupt means electrically connected to said indication means first output and which is capable of providing an indication to any said operating device corresponding thereto that a said receive indication has been received by said indication means, and further comprises a transmit interrupt means electrically connected to said indication means second output and which is capable of providing an indication to any said operating device corresponding thereto that a said transmit indication has been received by said indication means.

8. The apparatus of claim 3 wherein a said receive indication is provided, in a said synchronization state, to that said operating device signal terminal means connected to a said signal assigner means output which next had output response signals in said first output sequence after those on that said signal assigner means output to which is connected that said operating device signal terminal means which received a said receive indication in that said synchronization state just past, and wherein a said transmit indication is provided, in that same said synchronization state, to that said operating device signal terminal means connected to a signal assigner means output which had output response signals in said first output sequence immediately preceding those on that said signal assigner means output to which is connected that said operating device signal terminal means which received a said transmit indication in that said synchronization state just past.

9. The apparatus of claim 3 wherein there are N assignment states and N operating device signal terminal means and said first state sequence repeats in correspondence with said state determination signals.

10. The apparatus of claim 6 wherein said system further comprises a cyclical state setting means having an output, said cyclical state setting means being capable of providing at said cyclical state setting means output a repeating sequence of N successive, different state determination signals, and wherein said signal shifter has a state determination input electrically connected to said cyclical state setting means output with each different said state determination signal placing said signal shifter in a corresponding said assignment state, and wherein said synchronization means has a state determination input electrically connected to said cyclical state setting means output with each different said state determination signal placing said synchronization means in a synchronization state corresponding to that assignment state occurring in said signal shifter also caused by that said state determination signal, said synchronization means providing both a said receive indication and a said transmit indication for each said synchronization state.

11. The apparatus of claim 8 wherein, for any said operating device signal terminal means, a said transmit indication is provided thereto only after an odd number of said synchronization states have passed since there has been a providing of a said receive indication thereto.

12. The apparatus of claim 8 wherein said synchronization means has a plurality of logic driver means with one thereof electrically connected to each said synchronization means output, where one of said logic driver means in each successive said synchronization state, receives a state indication obtained from that said state determination signal occurring for that said synchronization state with said plurality of logic driver means receiving said state indications in that order, a first order, that said signal terminal means connected to each said logic driver means would receive output response signals from said signal assigner means in said first output sequence, and where one of said logic driver means, in each successive said synchronization state, receives that said indication occurring for that said synchronization state with said plurality of logic driver means receiving said state indications in that order that is formed by a circular permutation of a reversal of said first order.

13. The apparatus of claim 10 wherein a said receive indication is provided, in a said synchronization state, to that said operating device signal terminal means connected to a said signal shifter output which next had output response signals in said first output sequence after those on that said signal shifter output to which is connected that said operating device signal terminal means which received a said receive indication in that said synchronization state just past, and wherein a said transmit indication is provided, in that same said synchronization state, to that said operating device signal terminal means connected to a signal shifter output which had output response signals in said first output sequence immediately preceding those on that said signal shifter output to which is connected that said operating device signal terminal means which received a said transmit indication in that said synchronization state just past.

14. The apparatus of claim 10 wherein there are N assignment states and N operating device signal terminal means and said first state sequence repeats in correspondence with said state determination signals.

15. The apparatus of claim 13 wherein, for any said operating device signal terminal means, a said transmit indication is provided thereto only after an odd number of said synchronization states have passed since there has been a providing of a said receive indication thereto.

16. The apparatus of claim 13 wherein said synchronization means has a plurality of logic driver means with one thereof electrically connected to each said synchronization means output, where one of said logic driver means in each successive said synchronization state, receives a state indication obtained from that said state determination signal occurring for that said synchronization state with said plurality of logic driver means receiving said state indications in that order, a first order, that said signal terminal means connected to each said logic driver means would receive output response signals from said signal shifter in said first output sequence, and where one of said logic driver means, in each successive said synchronization state, receives that said indication occurring for that said synchronization state with said plurality of logic driver means receiving said state indications in that order that is formed by a circular permutation of a reversal of said first order.

17. An interrupt notice system permitting individual ones of a plurality of operating devices provided in a cooperative arrangement thereof, to indicate to others in that arrangement that procedures to interrupt operations of such others are being initiated, said system comprising:

a plurality of signal terminal means to each of which a corresponding one of said operating devices can be electrically connected, and with each of said signal terminal means being capable of receiving signals at a receive input thereof for indicating to any said operating device corresponding thereto that another of said plurality of operating devices, if any, is initiating procedures to interrupt operation of that corresponding said operating device, and each of said signal terminal means being capable of transmitting signals at a transmit output thereof from any said operating device corresponding thereto for being conveyed to others of said plurality of signal terminal means indicating that procedures are being initiated to interrupt operations of each operating device corresponding thereto, if any;

a signal shifter having a plurality of signal shifter inputs at each of which one of said plurality of operating device signal terminal means is electrically connected at its transmit output in an ordered input connection sequence, and having a plurality of signal shifter outputs at each of which one of said plurality of operating device signal terminal means is electrically connected at its receive input, said signal shifter being capable, beginning in one shift state thereof, of receiving signals from each said operating device signal terminal means transmit output at its corresponding said signal shifter input and providing such received signals at each said signal shifter input, in a zero shift position without any shift, to that said signal shifter output which is connected to said receive input of that same operating device signal terminal means providing such received signals, and being further capable, beginning in that next succeeding shift state, of receiving signals from each said operating signal terminal means transmit output at its corresponding said signal shifter input and providing such received signals at each said signal shifter input, now shifted one shift position, to that said signal shifter output which is connected to that said receive input of that operating device signal terminal means which is next in said input connection sequence after that said operating device signal terminal means providing such received signals, and said signal shifter being further capable, in each successive shift state thereafter, of receiving signals from each said operating device signal terminal means transmit output at its corresponding said signal shifter input and providing them to that said signal shifter output connected to that said operating device signal terminal means next in said input connection sequence after that said operating device signal terminal means connected to that signal shifter output which was provided said received signals in that shift state just past; and a synchronization means having a plurality of outputs at each of which one of said plurality of operating device signal terminal means is electrically connected at an indication input thereof, said synchronization means being capable of providing a receive indication to each of said plurality of said operating device signal terminal means during a corresponding one of said shift states taken by said signal shifter indicating that each said operating device signal terminal means, after receiving its receive indication, is ready to receive in a subsequent shift state signals from its corresponding said signal shifter output which occurs, if it occurs at all, in response to a signal selectively transmitted by a first selected one of said plurality of operating device signal terminal means to its corresponding signal shifter input, and being capable of providing a further transmit indication to each of said plurality of operating device signal terminal means during a corresponding one of said shift states taken by said signal shifter indicating that each said operating device signal terminal means, after receiving its transmit indication, can selectively transmit a signal to its corresponding said signal shifter input which will result in said signal shifter providing signals to a second selected one of said plurality of operating device signal terminal means in a subsequent shift state.

18. The apparatus of claim 17 wherein each said signal terminal means has an indication detection means having an input serving as said indication input thereof at which said receive indications and said transmit indications can be received and having first and second outputs, said indication detection means being capable of providing a signal on said indication detection means first output if a said receive indication has been received at said indication detection means input, and of providing a signal on said indication detection means second output if a transmit indication has been received at said indication detection means input.

19. The apparatus of claim 18 wherein each said signal terminal means further comprises a receive interrupt means electrically connected to said indication means first output and which is capable of providing an indication to any said operating device corresponding thereto that a said receive indication has been received by said indication means, and further comprises a transmit interrupt means electrically connected to said indication means second output and which is capable of providing an indication to any said operating device corresponding thereto that a said transmit indication has been received by said indication means.

20. The apparatus of claim 17 wherein said system further comprises a cyclical state setting means having an output, said cyclical state setting means being capable of providing at said cyclical state setting means output a repeating sequence of N successive, different state determination signals, and wherein said signal shifter has a state determination input electrically connected to said cyclical state setting means output with each different said state determination signal placing said signal shifter in a corresponding said shift state, and wherein said synchronization means has a state determination input electrically connected to said cyclical state setting means output with each different said state determination signal placing said synchronization means in a synchronization state corresponding to that shift state occurring in said signal shifter also caused by that said state determination signal, said synchronizing means providing both a said receive indication and a said transmit indication for each said synchronization state.

21. The apparatus of claim 20 wherein a said receive indication is provided, in a said synchronization state, to that said operating device signal terminal means connected to a said signal shifter output which next had output response signals in said first output sequence after those on that said signal shifter output to which is connected that said operating device signal terminal means which received a said receive indication in that said synchronization state just past, and wherein a said transmit indication is provided, in that same said synchronization state, to that said operating device signal terminal means connected to a signal shifter output which had output response signals in said first output sequence immediately preceding those on that said signal shifter output to which is connected that said operating device signal terminal means which received a said transmit indication in that said synchronization state just past.

22. The apparatus of claim 20 where there are N shift states and N operating device signal terminal means and said signal shifter, after reaching that shift state in which signals received at said signal shifter inputs have been shifted N−1 shift positions after said zero shift position, returns to that shift state in which said zero shift position occurs.

23. The apparatus of claim 21 wherein, for any said operating device signal terminal means, a transmit indication is provided thereto only after an odd number of said synchronization states have passed since there has been a providing of a receive indication thereto.

24. The apparatus of claim 21 wherein said synchronization means has a plurality of logic driver means with one thereof electrically connected to each said synchronization means output, where one of said logic driver means in each successive said synchronization state, receives a state indication obtained from that said state determination signal occurring for that said synchronization state with said plurality of logic driver means receiving said state indications in that order, a first order, that said signal terminal means connected to each said logic driver means would receive output response signals from said signal shifter in said first output sequence, and where one of said logic driver means, in each successive said synchronization state, receives that said indication occurring for that said synchronization state with said plurality of logic driver means receiving said state indications in that order that is formed by a circular permutation of a reversal of said first order.

25. The apparatus of claim 17 where an odd number of shift states is required for a selected said operating device signal terminal means to provide a signal to its signal shifter input followed by said signal shifter providing a corresponding signal at a signal shifter output, and thereafter followed by a said operating device signal terminal means receiving and completing its response to that said signal on said signal shifter output.

26. A method of permitting individual ones of a plurality of operating devices, provided in a cooperative arrangement thereof, to indicate to others in that arrangement that procedures to interrupt operations of such others are being initiated, there being a plurality of signal terminal means to each of which a corresponding one of said operating devices can be electrically connected, and with each of said signal terminal means being capable of receiving signals at a receive input thereof for indication to any said operating device corresponding thereto that another of said plurality of operating devices, if any, is initiating procedures to interrupt operation of that corresponding said operating device, and each of said signal terminal means being capable of transmitting signals at a transmit output thereof from any said operating device corresponding thereto for being conveyed to others of said plurality of signal terminal means indicating that procedures are being initiated to interrupt operations of each operating device corresponding thereto, if any, said operating device signal terminal means being ordered in a first sequence, said method comprising:

transmitting signals, if any; from each of said operating device signal terminal means transmit outputs in each of a succession of time durations;

presenting a representation of each said transmitted signal to a said receive input of a said operating device signal terminal means, where such presenting, beginning in a reference one of said time durations, is such that each said representation is presented to that said operating device signal terminal means which provided that said transmitted signal from which that representation presented thereto was obtained, and where, beginning in each succeeding said time duration after said reference time duration, a representation of each such transmitted signal transmitted by a said operating device signal terminal means in that time duration is again presented to a said receive input of a said operating device signal terminal means but to that one thereof further in said first sequence from that one presenting transmitted signals on which such representation is based by that number of first sequence positions equal to that number of time durations which have passed since said reference time duration;

providing a receive indication to each of said plurality of operating device signal terminal means during a said time duration indicating that said operating device signal terminal means, after receiving its said receive indication, is to be ready to receive in a subsequent time duration a said transmitted signal from a first selected one of said plurality of said operating device signal terminal means; and providing a transmit indication to each of said plurality of operating device signal terminal means during a said time duration indicating that each said operating device signal terminal means, after receiving its said transmit indication, can selectively transmit a signal to a second selected one of said plurality of operating device signal terminal means in a subsequent time duration.

27. The method of claim 26 wherein, for any said operating device signal terminal means, a transmit indication is provided thereto only after an odd number of said time durations has passed since there has been a providing of a receive indication thereto.

28. The method of claim 26 wherein a said receive indication is provided, in a said time duration, to that said operating device signal terminal means next in said interconnection sequence after that said operating device signal terminal means which received a said receive indication in that said time duration just past, and wherein a said transmit indication is provided, in that same said time duration, to that said operating device signal terminal means which preceded in said interconnection sequence that said operating device signal terminal means which received a said transmit indication in that said time duration just past.

29. The method of claim 26 wherein there are N operating device signal terminal means and, after a said representation is presented to an operating device signal terminal N−1 positions in said first sequence past that operating device signal terminal means transmitting a signal on which each representation is based, each representation is again presented to that said operating device signal terminal means which provided that said transmitted signal on which said representation being presented is based.

* * * * *